US012608511B2

(12) United States Patent
Burla et al.

(10) Patent No.: US 12,608,511 B2
(45) Date of Patent: Apr. 21, 2026

(54) COMPUTER AIDED GENERATIVE DESIGN WITH OVERALL THICKNESS CONTROL TO FACILITATE MANUFACTURING AND STRUCTURAL PERFORMANCE

(71) Applicant: Autodesk, Inc., San Francisco, CA (US)

(72) Inventors: Ravi Kumar Burla, Novi, MI (US); Jaesung Eom, Wexford, PA (US); Jesus Rodriguez, Farmington, MI (US)

(73) Assignee: Autodesk, Inc., San Francisco, CA (US)

( * ) Notice: Subject to any disclaimer, the term of this patent is extended or adjusted under 35 U.S.C. 154(b) by 135 days.

(21) Appl. No.: 18/135,055

(22) Filed: Apr. 14, 2023

(65) Prior Publication Data

US 2023/0281348 A1 Sep. 7, 2023

Related U.S. Application Data

(63) Continuation of application No. 16/871,718, filed on May 11, 2020, now Pat. No. 11,645,431.

(51) Int. Cl.
 G06F 7/48 (2006.01)
 G06F 30/12 (2020.01)
 (Continued)

(52) U.S. Cl.
 CPC .......... G06F 30/12 (2020.01); G06F 2111/04 (2020.01); G06F 2111/10 (2020.01); G06F 2113/10 (2020.01)

(58) Field of Classification Search
 CPC .............. G06F 2111/04; G06F 2111/10; G06F 2113/10; G06F 30/10; G06F 30/12; G06F 30/20
 See application file for complete search history.

(56) References Cited

U.S. PATENT DOCUMENTS 6,931,367 B2 8/2005 Harwood
8,706,283 B2 4/2014 Wang et al.
 (Continued)

FOREIGN PATENT DOCUMENTS

CN 109313670 2/2019
CN 110287512 9/2019
 (Continued)

OTHER PUBLICATIONS

Neagoe, Ion, Alexandru Catalin Filip, and Alexandru Manolescu. "Digital scanning method for thickness analysis of hollow parts manufactured by incremental forming on a CNC Lathe." Applied Mechanics and Materials 657 (2014): 142-146.*
 (Continued)

*Primary Examiner* — Nithya J. Moll
(74) *Attorney, Agent, or Firm* — Fish & Richardson P.C.

(57) ABSTRACT

Methods, systems, and apparatus, including medium-encoded computer program products, for computer aided design of physical structures using generative design processes, where the three dimensional (3D) models of the physical structures are produced in accordance with a design criterion that limits a minimum thickness of the generatively designed 3D models, include: obtaining a design space for an object to be manufactured and one or more design criteria including a thickness constraint; iteratively modifying a generatively designed 3D shape of the modeled object in the design space in accordance with the one or more design criteria, including measuring a current thickness for the 3D shape using an overall relationship of a volume of the 3D shape with respect to a surface area of the 3D shape; and providing the generatively designed model for use in manufacturing the physical structure using one or more computer-controlled manufacturing systems.

18 Claims, 10 Drawing Sheets

(51) Int. Cl.
  *G06F 111/04* (2020.01)
  *G06F 111/10* (2020.01)
  *G06F 113/10* (2020.01)

(56) References Cited

U.S. PATENT DOCUMENTS

| | | | |
|---|---|---|---|
| 9,990,455 | B1 | 6/2018 | Sinivaara et al. |
| 11,645,431 | B2 | 5/2023 | Burla et al. |
| 2012/0232685 | A1* | 9/2012 | Wang .................... B22D 46/00 |
| | | | 700/98 |
| 2016/0246897 | A1* | 8/2016 | Kannan .................. G06F 30/00 |
| 2017/0372480 | A1 | 12/2017 | Anand et al. |
| 2018/0229446 | A1 | 8/2018 | Linas et al. |
| 2018/0345647 | A1 | 12/2018 | Morris et al. |
| 2018/0349531 | A1 | 12/2018 | Morris et al. |
| 2019/0250580 | A1 | 8/2019 | Hebrard et al. |
| 2020/0004225 | A1 | 1/2020 | Buller et al. |
| 2020/0150623 | A1 | 5/2020 | Bandara et al. |
| 2020/0151286 | A1 | 5/2020 | Willis et al. |
| 2020/0209834 | A1 | 7/2020 | Behandish et al. |
| 2021/0350036 | A1 | 11/2021 | Burla et al. |

FOREIGN PATENT DOCUMENTS

| | | |
|---|---|---|
| JP | 2003-172137 | 6/2003 |
| JP | 2011-28335 | 2/2011 |
| JP | 2011-186980 | 9/2011 |
| WO | WO 2017186786 | 11/2017 |

OTHER PUBLICATIONS

Office Action in Japanese Appln. No. 2022-568651, dated Nov. 7, 2023, 5 pages (with English translation).

Office Action in Chinese Appln. No. 202180032857.X, dated Oct. 13, 2023, 15 pages (with English translation).

Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.

Brackett et al., "Topology Optimization for Additive Manufacturing," in Proceedings of the Solid Freeform Fabrication Symposium (2011) 15 pages.

Dapogny et al., "Geometric Constraints for Shape and Topology Optimization in Architectural Design," Computational Mechanics, Springer-Verlag, 2017, 59(6):933-965. 10.1007/s00466-017-1383-6. hal-01354004v3.

Gibou et al., "A Review of Level-set Methods and Some Recent Applications," Journal of Computational Physics (2018) 353:82-109.

Guest and Zhu, "Casting and Milling Restrictions in Topology Optimization via Projection-based Algorithms," in ASME 2012 International Design Engineering Technical Conferences and Computers and Information in Engineering Conference (2012) 8 pages.

Hoglund et al., "An Anisotropic Topology Optimization Method for Carbon Fiber-Reinforced Fused Filament Fabrication", published on Aug. 1, 2016, retrieved from URL<https://baylor-ir.tdl.org/baylor-ir/bitstream/handle/2104/9821/hoglund-thesis-2016.pdf?sequence=1&isallowed=y>, pp. i-169.

Ikeya and Shimoda, "Multi-objective Free-form Optimization for Shape and Thickness of Shell Structures with Composite Materials," in 11th World Congress on Structural and Multidisciplinary Optimisation (2015) 6 pages.

Joshi et al., "CAD-integrated Topology Optimization (BGCE Honours Project)," Department of Informatics, Technical University of Munich (2016) 77 pages.

Langelaar, "Topology Optimization for Multi-axis Machining," Comput. Methods Appl. Mech. Engrg. (2019) 351:226-252.

Liu and Ma, "A Survey of Manufacturing Oriented Topology Optimization Methods," Advances in Engineering Software (2016) 100:161-175.

Liu et al., "Current and Future Trends in Topology Optimization for Additive Manufacturing," Structural and Multidisciplinary Optimization (2018) 57:2457-2483.

Lu et al., "Build-to-Last: Strength to Weight 3D Printed Objects," ACM Trans. Graph. (2014) 33(4):97:1-97:10.

Nakayama and Shimoda, "Shape-topology Optimization for Designing Shell Structures," in VII European Congress on Computational Methods in Applied Sciences and Engineering (2016) 10 pages.

PCT International Search Report and Written Opinion in International Appln. No. PCT/US2021/027644, dated Aug. 4, 2021, 16 pages.

Plocher et al., "Review on design and structural optimisation in additive manufacturing: Towards next-generation lightweight structures", Materials and Design, Aug. 27, 2019, 183:1-20.

Sigmund and Maute, "Topology Optimization Approaches—a Comparative Review," Struct. Multidisc. Optim. (2013) 48:1031-1055.

Unknown author, "Topology Optimization R18.0 Feature and Usage Highlights," © 2016 Ansys, Inc., Mar. 12, 2017, 29 pages.

Van Dijk et al., "Level-set Methods for Structural Topology Optimization: a Review," Struct. Multidisc. Optim. (2013) 48:437-472.

Vatanabe et al., "Topology Optimization with Manufacturing Constraints: a Unified Projection-based Approach," Advances in Engineering Software (2016) 100:97-112.

Xia et al., "A Level Set Based Method for the Optimization of Cast Part," Struct. Multidisc. Optim. (2010) 41:735-747.

Yoon et al., "Minimum thickness control at various levels for topology optimization using the wavelet method," International Journal of Solids and Structures, 2005, 42:5945-5970.

Communication pursuant to Article 94(3) EPC in EP Appln. No. 21725286.5, mailed on Nov. 13, 2025, 11 pages.

\* cited by examiner

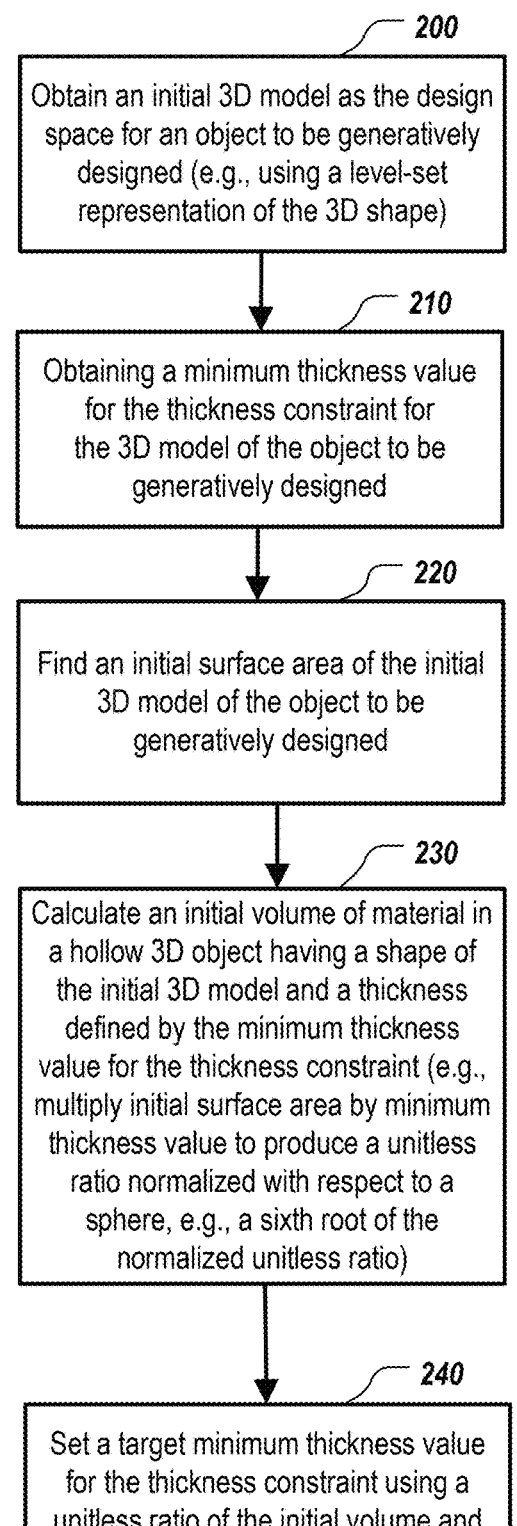

200

Obtain an initial 3D model as the design space for an object to be generatively designed (e.g., using a level-set representation of the 3D shape)

210

Obtaining a minimum thickness value for the thickness constraint for the 3D model of the object to be generatively designed

220

Find an initial surface area of the initial 3D model of the object to be generatively designed

230

Calculate an initial volume of material in a hollow 3D object having a shape of the initial 3D model and a thickness defined by the minimum thickness value for the thickness constraint (e.g., multiply initial surface area by minimum thickness value to produce a unitless ratio normalized with respect to a sphere, e.g., a sixth root of the normalized unitless ratio)

240

Set a target minimum thickness value for the thickness constraint using a unitless ratio of the initial volume and the initial surface area

COMPUTER AIDED GENERATIVE DESIGN WITH OVERALL THICKNESS CONTROL TO FACILITATE MANUFACTURING AND STRUCTURAL PERFORMANCE

CROSS-REFERENCE TO RELATED APPLICATION

This is a continuation of U.S. application Ser. No. 16/871, 718, filed on May 11, 2020, the disclosure of which is considered part of and is incorporated by reference in the disclosure of this application.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to evaluate, plan and control the manufacture of the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, examples of design constraints include maximum mass, maximum deflection under load, maximum stress, etc.

The inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver. The set of input solids can include "preserve bodies", which should always be present in the design and which represent interfaces to other parts of the systems or locations on which boundary conditions should be applied (for example mechanical loads and constraints). Other regions in which geometry should or should not be generated can also be provided in a similar manner, such as input solids that define "obstacle bodies", which represent regions where new geometry should not be generated.

SUMMARY

This specification describes technologies relating to computer aided design of physical structures using generative design processes, where the three-dimensional (3D) models of the physical structures are produced in accordance with a design criterion that limits a minimum thickness of the generatively designed three dimensional shape, e.g., a global thickness constraint. The design criterion or global thickness constraint can exert thickness control during shape and/or topology optimization by measuring the overall thickness of a part/model. This overall thickness measure can be used to compute a thickness limit for a given input model based on the input model's characteristics and based on user input indicating a minimum thickness amount. The thickness limit can be applied as a constraint in topology optimization to control the thickness of the evolved shape globally.

In general, one or more aspects of the subject matter described in this specification can be embodied in one or more methods (and also one or more non-transitory computer-readable mediums tangibly encoding a computer program, e.g., a computer aided-design program, operable to cause data processing apparatus to perform operations), including: obtaining (e.g., by the computer aided design program) a design space for a modeled object, for which a corresponding physical structure is to be manufactured, one or more design criteria for the modeled object, and one or more in-use load cases for the physical structure, wherein the one or more design criteria include a thickness constraint; iteratively modifying (e.g., by the computer aided design program) a generatively designed three dimensional shape of the modeled object, including modifying both a geometry of the three dimensional shape and a topology of the three dimensional shape, in the design space in accordance with the one or more design criteria and the one or more in-use load cases, wherein the iteratively modifying includes employing the thickness constraint by measuring a current thickness for the three dimensional shape using an overall relationship of a volume of the three dimensional shape with respect to a surface area of the three dimensional shape; and providing (e.g., by the computer aided design program) the generatively designed three dimensional shape of the modeled object for use in manufacturing the physical structure using one or more computer-controlled manufacturing systems.

The overall relationship can include a unitless ratio of the volume of the three dimensional shape squared and the surface area of the three dimensional shape cubed, and/or the obtaining can include: obtaining an initial three dimensional model as the design space; obtaining a minimum thickness value for the thickness constraint; finding an initial surface area of the initial three dimensional model; calculating an initial volume of material in a hollow three dimensional object having a shape of the initial three dimensional model and a thickness defined by the minimum thickness value; and setting a target minimum value for the thickness constraint using the unitless ratio of the initial volume and the initial surface area. Calculating the initial volume can include multiplying the initial surface area of the initial three dimensional model by the minimum thickness value. In addition, the overall relationship can include the unitless ratio normalized with respect to a sphere.

The iteratively modifying can include: performing numerical simulation of the modeled object in accordance with a current version of the three dimensional shape and the one or more in-use load cases to produce a current numerical assessment of a physical response of the modeled object; measuring the current thickness of the current version of the three dimensional shape using the overall relationship of volume with respect to surface area for the three dimensional shape as a whole; updating the current version of the three dimensional shape based on the current numerical assessment of the physical response, and based on a difference between the current thickness and a current target minimum value for the thickness constraint, to produce an updated version of the three dimensional shape of the modeled object; and repeating at least the performing, the measuring and the updating until a predefined number of shape modification iterations have been performed or until the generatively designed three dimensional shape of the modeled object in the design space converges to a stable solution for the one or more design criteria and the one or more in-use load cases.

Further, the updating can include: computing shape change velocities for an implicit surface in a level-set representation of the three dimensional shape in accordance with the current numerical assessment and the difference between the current thickness and the current target minimum value for the thickness constraint; and modifying the level-set representation using the shape change velocities to produce an updated version of the three dimensional shape of the modeled object; and the repeating can include at least a second portion following a first portion, the second portion of the repeating including applying a local thickness constraint using the minimum thickness value, the local thickness constraint having not been applied during the first portion of the repeating.

One or more aspects of the subject matter described in this specification can also be embodied in one or more systems including: a non-transitory storage medium having instructions of a computer aided design program stored thereon; and one or more data processing apparatus configured to run the instructions of the computer aided design program to perform any of the one or more methods (or operations performed by the data processing apparatus in accordance with the computer program tangibly encoded in one or more non-transitory computer-readable mediums) described herein. The one or more systems can further include one or more additive, subtractive and/or other manufacturing machines.

Particular embodiments of the subject matter described in this specification can be implemented to realize one or more of the following advantages. Global control of thickness during shape evolution in a generative design process makes thickness control possible for complex 3D models, as the global measure of thickness can be computed efficiently at each iteration of the shape and/or topology optimization loop (e.g., the computations involve only calculation of volume and surface area of the model) during the generative design process. Moreover, the global measure of thickness is more robust than local thickness measures, as local thickness measures (i.e., measures of thickness that are evaluated at multiple points within a 3D model rather than for the 3D model as a whole) can be inaccurate or even fail entirely, depending on the geometry of the evolving shape around the point of evaluation. Thus, applying overall thickness control during generative design enables efficient shape and/or topology optimization that also prevents the production of overly thin regions in the optimized shape, where such thin regions can result in structural performance degradation or manufacturing difficulties.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 2A shows an example of a process of setting a thickness constraint target for generative design.

FIG. 2F shows an example (in two dimensions) of determining an initial volume of a hollow 3D object having a shape of the initial 3D model used for generative design.

Like reference numbers and designations in the various drawings indicate like elements.

DETAILED DESCRIPTION

Figure 1A:
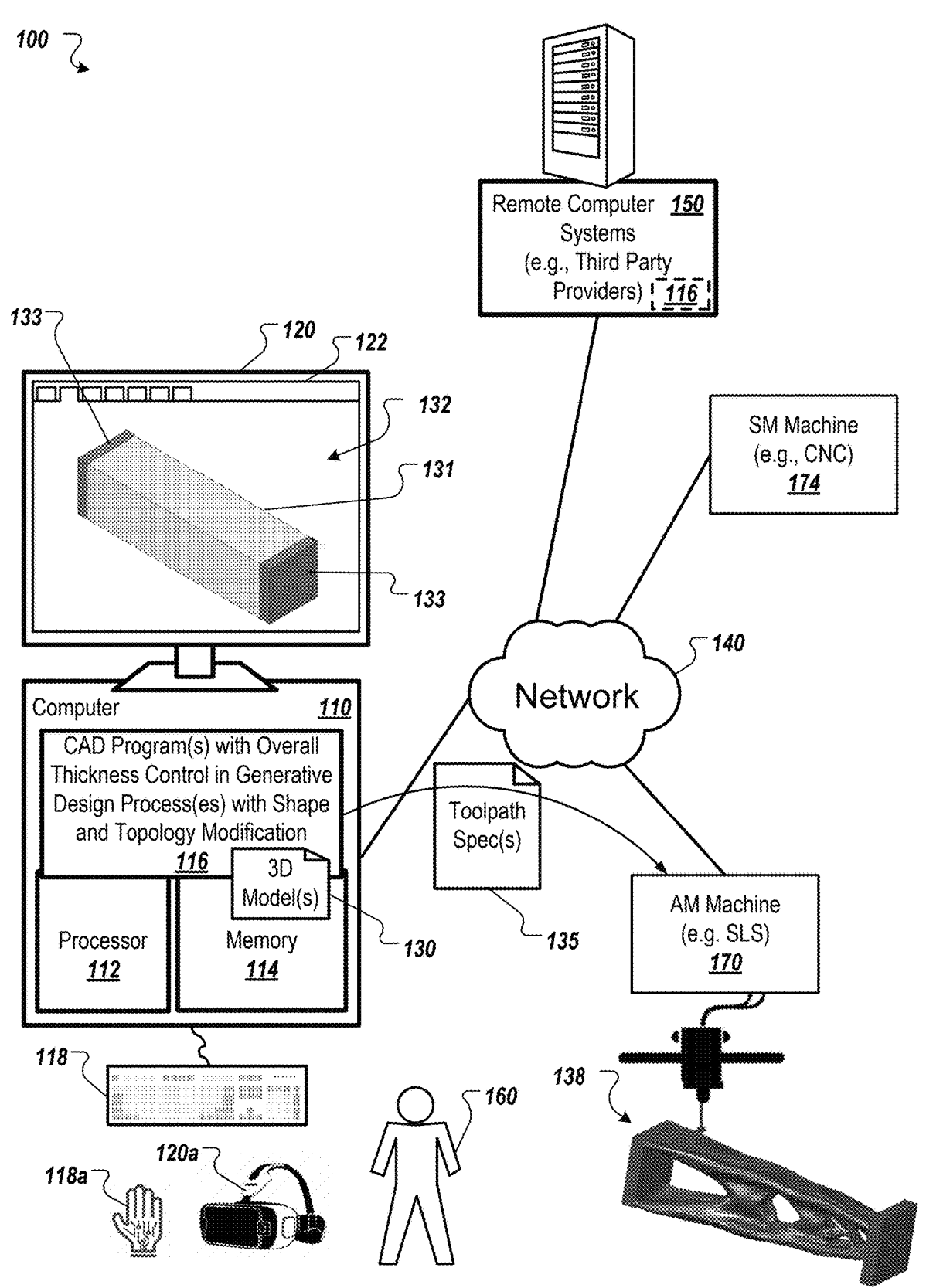
FIG. 1A shows an example of a system usable to design and manufacture physical structures using an overall thickness control.

FIG. 1A shows an example of a system 100 usable to design and manufacture physical structures using an overall thickness control. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes one or more generative design processes for topology optimization using numerical simulation (e.g., using one or more level-set based topology optimization methods or one or more Solid Isotropic Material with Penalization (SIMP) topology optimization methods).

The numerical simulation performed by the CAD program(s) 116 can simulate one or more physical properties and can use one or more types of simulation to produce a numerical assessment of physical response (e.g., structural response) of the modelled object. For example, finite element analysis (FEA), including linear static FEA, finite difference method(s), and material point method(s) can be used. Further, the simulation of physical properties performed by the CAD program(s) 116 can include Computational Fluid Dynamics (CFD), Acoustics/Noise Control, thermal conduction, computational injection molding, electric or electro-magnetic flux, and/or material solidification (which is useful for phase changes in molding processes) simulations. Moreover, the CAD program(s) 116 can potentially implement hole and/or fixture generation techniques to support clamping during manufacturing and/or manufacturing control functions.

As used herein, CAD refers to any suitable program used to design physical structures that meet design requirements, regardless of whether or not the CAD program is capable of interfacing with and/or controlling manufacturing equipment. Thus, CAD program(s) 116 can include Computer Aided Engineering (CAE) program(s), Computer Aided Manufacturing (CAM) program(s), etc. The CAD program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that one or more programs 116 operating locally at computer 110 can offload processing operations (e.g., generative design and/or numerical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) and/or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

An initial 3D model 132 can be an input to a generative design process. In the example shown, the initial 3D model 132 is produced from a set of preserve bodies 133, which can be created by the user 160 interacting with the UI 122, loaded or received, or provided as output from another process. In this example, a design space 131 is obtained by determining the 3D space between the preserve bodies 133, but other approaches are also possible. For example, the design space can be obtained by determining a bounding volume or a convex hull for an input model, e.g., for the preserve bodies 133, or the user 160 can directly specify the design space by interacting with the UI 122. In any case, the design space is the volume of space inside which the part/object is to be designed during shape and/or topology optimization. In general, the user 160 can define a shape/topology optimization problem for a generative design process to produce a desired 3D model from a starting 3D model, or the input can be a design space without a specific starting 3D model. Note that the generative design process itself can produce starting geometry within the design space. For example, one or more seed models can be used as input to the generative design process, both initially and later on, to introduce holes during shape evolution so as to modify the topology of the generative design.

In addition, as shown, a starting model 132 can include input preserve geometry, which can be unconnected modelled solids 133, where the generative design process is used to produce new 3D geometry that connects the input solids 133 within the design space 131. The user 160 can employ the UI 122 to define a mechanical problem, for a generative design process to operate on, to produce a new 3D model from a starting 3D model 132. Thus, in addition to enabling creation of the initial model 132, the UI 122 can enable the user 160 to specify a domain for shape/topology optimization and loading cases that will govern the generative design process along with one or more design criteria.

In some implementations, the user 160 (or other person or program) can specify a design space for an object to be manufactured, a numerical simulation setup (e.g., load(s) and material(s)) for numerical simulation (e.g., FEA, CFD, Acoustics/Noise Control, thermal conduction, computational injection molding simulations, electric or electro-magnetic flux, material solidification, etc.) of the object, at least one design objective (e.g., minimize material usage) for the object, and at least one design constraint (e.g., a volume constraint) for the object. In some implementations, the inputs for use in numerical simulation and generative design processes can include one or more regions of a current 3D model in which to generate new 3D geometry, loading case(s) defining one or more loads in one or more different directions to be borne by a physical structure being designed, one or more materials (e.g., one or more isotropic solid materials identified as a baseline material model for the design space), one or more seed model types to use as input to a generative design process, one or more generative design processes to use, and/or one or more lattice topologies to use in one or more regions of the design space. Inputs to the generative design and numerical simulation processes can include non-design spaces, different types of components (e.g., rods, bearings, shells), one or more target manufacturing processes and associated parameters, obstacle geometries that should be avoided, preserve geometries that should be included in the final design, and parameters related to various aspects, such as resolution of the design, type of synthesis, etc.

Moreover, the CAD program(s) 116 provide user interface elements in the UI 122 to enable the user 160 to specify the various types of inputs noted above, and all (or various subsets) of these inputs can be used in the generative design and numerical simulation processes described in this specification. Further, the user 160 can be enabled by the UI 122 of the CAD program(s) 116 to design a part using traditional 3D modelling functions (to build precise geometric descriptions of the 3D design model) and then use generative design and simulation processes in a design space specified within one or more portions of the initial 3D model. Thus, as will be appreciated, many possible types of physical structures can be designed using the systems and techniques described in this specification, the UI 122 can be used to create a full mechanical problem definition for a part to be manufactured, and the generative design and numerical simulation processes can accelerate new product development by enabling increased performance without time consuming physical testing.

Further, as described herein, the CAD program(s) 116 implement at least one generative design process, which enables the CAD program(s) 116 to generate one or more portions of the 3D model(s) automatically (or the entirety of a 3D model) based on design objective(s) and constraint(s), i.e., design criteria, where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time (e.g., as specified by a predefined number of shape modification iterations) given the available processing resources. The design criteria can be defined by the user 160, or by another party and imported into the CAD program(s) 116. The design criteria can include structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use). Moreover, the design criteria include a minimum thickness requirement, and the CAD program(s) 116 enforce this minimum thickness requirement by applying overall thickness control during the generative design process, as described in detail below.

Various generative design processes can be used, which can optimize the shape and topology of at least a portion of the 3D model. The iterative optimization of the geometric design of the 3D model(s) by the CAD program(s) 116 can involve topology optimization, which is a method of light-weighting where the optimum distribution of material is determined by minimizing an objective function subject to design constraints (e.g., structural compliance with volume as a constraint). There are two primary categories of topology optimization: density-based approaches and boundary-based approaches. Density-based approaches discretize the volume of the part and assign a density to each discrete cell, such as in a SIMP method. Then the densities are driven toward solid and empty while supporting the specified boundary conditions. Boundary-based approaches instead track the shape of the external interface of the solid part and move the boundary such that the constraints are satisfied, such as in a level-set method.

As described in this specification, enforcing a minimum thickness requirement by applying overall thickness control during the generative design process can improve the functioning of the computer 110 by enabling efficient shape convergence during the optimization process while also ensuring a minimum thickness for the generatively designed part, which can facilitate manufacturing of the part, structural performance of the part, or both. A common issue relating to structural design using topology optimization is that some of the regions in the optimized shape can be very thin, resulting in structural performance degradation or manufacturing difficulties. The structural validation of stress constraints or buckling of the optimized shape may uncover problems in thin-member areas, but the use of a minimum thickness requirement can avoid the creation of such thin-member areas altogether. Furthermore, thin members also cause difficulties in manufacturing, e.g., 3D printing, as they inherently are not very stiff and may not take the self-load during the manufacturing process, e.g., while 3D printing.

These problems can be solved using the presently described systems and techniques for thickness control during generative design, e.g., topology optimization, where the overall thickness of the part/model can be measured and used efficiently during the generative design process. For at least a portion of the generative design process, a single thickness measure can be used for the entire model, thus providing a global approach to measuring thickness, rather than having to measure thickness locally at each of multiple regions of the 3D model during each iteration of shape modification, which can substantially slow the process of shape and topology optimization. Note that the thickness measure is "single" in the sense that one measurement can capture the thickness of a 3D model overall, where that 3D model includes many regions having very different actual thicknesses in the respective regions. However, more than one minimum thickness criterion or constraint can be applied, either serially or in parallel, in the generative design process so as to generate multiple 3D model design options for the part to be manufactured.

In any case, once the user 160 is satisfied with a generatively designed 3D model, the 3D model can be stored as a 3D model document 130 and/or used to generate another representation of the model (e.g., an .STL file for additive manufacturing). This can be done upon request by the user 160, or in light of the user's request for another action, such as sending the 3D model to an additive manufacturing (AM) machine 170, or other manufacturing machinery, which can be directly connected to the computer 110, or connected via a network 140, as shown. This can involve a post-process carried out on the local computer 110 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files. In addition, the user 160 can save or transmit the 3D model for later use. For example, the CAD program(s) 116 can store the document 130 that includes the generated 3D model.

The CAD program(s) 116 can provide a document 135 (having toolpath specifications of an appropriate format) to the AM machine 170 to produce a complete structure 138, which includes the optimized topology and shape. The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Filament Fabrication (FFF), which can include metals deposition AM).

In some implementations, subtractive manufacturing (SM) machine(s) 174 (e.g., a Computer Numerical Control (CNC) milling machine, such as a multi-axis, multi-tool milling machine) can also be used in the manufacturing process. Such SM machine(s) 174 can be used to prepare initial workpieces on which AM machine(s) 170 will operate. In some implementations, a partially complete structure 138 is generated by the AM machine(s) 170 and/or using casting methods (e.g., investment casting (IC) using ceramic shell or sand casting (SC) using sand cores), and this partially complete structure 138 then has one or more portions removed (e.g., finishing) by the CNC machine 174 in order to form the completed structure. In some implementations, the CAD program(s) 116 can provide a corresponding document 135 (having toolpath specifications of an appropriate format, e.g., a CNC numerical control (NC) program) to the SM machine 174 for use in manufacturing the part using various cutting tools, etc. Moreover, in some implementations, the complete structure 138 is produced in its entirely using SM machine(s) 174.

In various implementations, the CAD program(s) 116 of the system 100 can implement one or more generative design processes as described in this specification. Generative design processes seek an optimal geometric shape, topology, or both. For example, generative design processes seek an optimal geometric shape among alternative designs by minimizing a performance-related objective function subject to constraints:

$$\text{minimize } J(s,u(s)) \ s \in \mathbb{R}^{n_s} \quad (1)$$

$$\text{such that } g_i(s,u(s))=0 \ i=1, \ldots ,n_g \quad (2)$$

where s is a vector of design variables related to a geometric shape of the domain, and u is a vector of state variables (e.g., displacement) that depend on s. Additional constraints (e.g., equilibrium) are denoted by a set gr. For simplicity, equality constraints are assumed here. Mathematical programming methods used to minimize (1) can be gradient-based or non-gradient-based. Gradient-based methods (versus non-gradient-based methods) generally use more information associated with design sensitivity, for example:

$$\frac{dJ}{ds}(s,u(s)) = \frac{\partial J}{\partial s} + \frac{\partial J}{\partial u}\frac{du}{ds} \quad (3)$$

which is a derivative of the performance-related objective function with respect to the design variables. In lattice-based methods, s represents a lattice thickness. In level-set based topology optimization methods, s represents a boundary of a solid region. In non-gradient-based methods, a pseudo gradient can be used for a constraint that does not have a well-defined gradient, such as using a gradient of strain energy as a proxy for a gradient of a thickness constraint. In general, topology optimization is an iterative optimization process where an objective is minimized by adding/removing material based on given constraint conditions. The objective is typically compliance or a form of compliance (like strain energy). Constraints typically restrict the addition/removal of material and they also restrict the regions inside the model where the material can be added or removed.

Figure 1B:
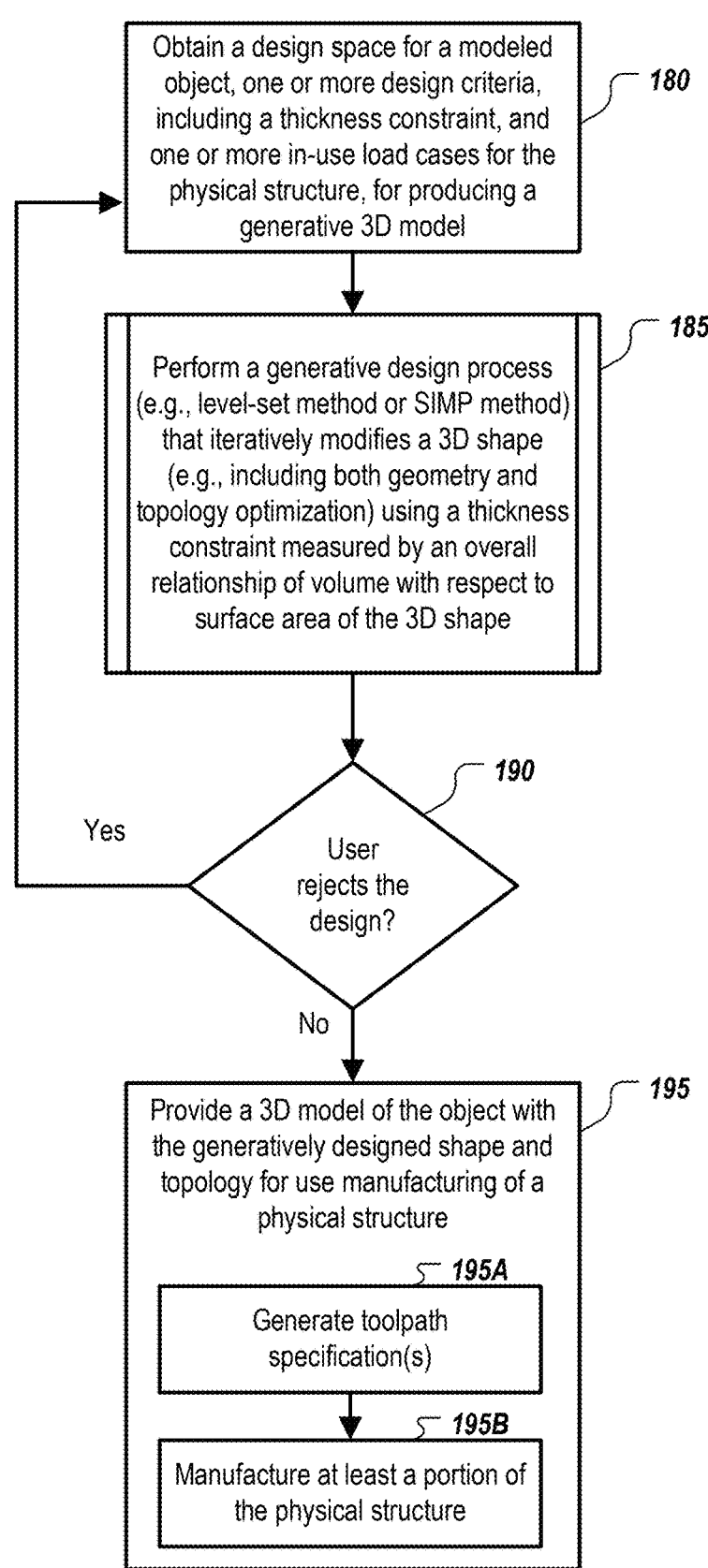
FIG. 1B shows an example of a process of designing and manufacturing physical structures using a global thickness constraint.

FIG. 1B shows an example of a process of designing and manufacturing physical structures using a global thickness constraint. A design space for a modeled object, one or more design criteria and one or more in-use load cases are obtained 180, e.g., by CAD program(s) 116, for use in producing a generative 3D model. The design space for the modelled object is the volume inside which the part is to be designed. The design space can include a bounding volume containing an initial specification of one or more outer shapes of the three dimensional topology for the object. As noted above, the design space can include 3D model(s), designed in or loaded into CAD program(s) 116, that serves as a sub-space of an optimization domain of a described generative design process, and/or a set of input solids that specify boundary conditions for generative design geometry production, e.g., B-Reps selected using UI 122 to specify sub-space(s) that are preserved for use as connection point(s) with other component(s) in a larger 3D model or separate 3D model(s).

Thus, a designer or engineer can provide a set of requirements in terms of loads, boundary conditions, materials, initial starting shape, manufacturing constraints and other parameters, and the software, e.g., CAD program(s) 116, produces various shapes that satisfy the requirements. Moreover, this set of requirements can include a minimum thickness requirement, and so the one or more design criteria can include a minimum thickness design criterion or minimum thickness constraint, as described herein. Additional design criteria can include various design objective(s) and design constraint(s) for the object. Design objectives can include but are not limited to minimizing waste material, minimizing the weight of the part, and minimizing the compliance, stress, or other intrinsic property of the part, and are used to drive the shape synthesis process towards better designs. Though not required, it is typical for a design objective to be rooted in a simulation of the design (linear static, fluid dynamic, electromagnetic, etc.). Design constraints can include a variety of geometric and physical characteristics or behaviors that should be met in any generated design (requirements either on individual parts or on the entire assembly are also admissible); examples include maximum mass, maximum deflection under load, maximum stress, etc.

Further, the obtained 180 one or more in-use load cases can include a setup for numerical simulation, e.g., densities of elements in an FEA model to be used with an optimized 3D topology of the part being generatively designed. In general, the setup for numerical simulation can include one or more physical properties to be simulated and one or more types of simulation to be performed, as well as potentially surrogate modelling or other methods of approximation. In some implementations, the type of numerical simulation is predefined, either for all uses of the program or given a particular context in the program from which the generative design process has been launched. Further, the setup for numerical simulation includes at least one set of loading conditions and/or other physical environment information associated with the type of numerical simulation to be performed.

With the generative design space and design criteria specified, one or more 3D model(s) are produced 185, e.g., by CAD program(s) 116, using one or more generative design processes that iteratively modify a 3D shape in the design space in accordance with the one or more design criteria and the one or more in-use load cases, while also using a thickness constraint that is measured by an overall relationship of a volume of the 3D shape with respect to a surface area of the 3D shape. In some implementations, only the shape of the 3D model is modified, i.e., the geometry of the 3D model is changed without changing its topology. But in typical structural engineering generative design, topology optimization is the primarily used technique. Thus, in some implementations, both the geometry of the 3D shape and the topology of the 3D shape are iteratively modified, e.g., by adding holes to modify the spatial properties of the surface that are unaffected by continuous deformation without tearing. Thus, how shape elements are bounded and connected can also be changed during the iterative generative design process 185.

The one or more generative design processes performed 185, e.g., by CAD program(s) 116, can include a boundary-based generative design process (e.g., using a level-set method) of topology optimization, a density-based generative design process (e.g., using a SIMP method), or both. In some implementations, the one or more generative design processes can use the level-set method(s), where s, from equations (1), (2) and (3), represents a boundary of a solid region that is implicitly represented using one or more level-sets, which are signed distance values computed on a Cartesian background grid. In a level-set-based topology optimization method, the outer shape of a structure is represented by a one-dimensional high-level level set function, and a change in shape and configuration is replaced by a change in the level set function value, so as to obtain an optimum structure. The level set function refers to a function that indicates whether each part of the design domain where the initial structure is set corresponds to a material domain (material phase) that forms the structure and is occupied by a material, a void domain (void phase) where a void is formed, or a boundary between these two domains, wherein a predetermined value between a value representing the material domain and a value representing the void domain represents the boundary between the material domain and the void domain.

Thus, the topology optimization 185 can take the initially provided shape along with loads, boundary conditions, manufacturing constraints, etc., and update the shape iteratively based on the feedback from structural simulation that is performed on the current shape. In some implementations, one or more of the following constraints are used. A volume fraction constraint sets a limit on the amount of material that can be removed from the model, and as the volume fraction is reached, the optimizer rearranges the material in the model so that the objective can be minimized. A stress constraint limits the amount of stress the model can undergo, and the optimizer adds/removes/rearranges the material in the model in order to satisfy this constraint. A displacement constraint limits the maximum amount of deformation the model can undergo, and manufacturing constraints are specific to the manufacturing methods that are used in the fabrication of the parts/objects from the 3D models. Some examples include additive (3P printing), milling and die-casting.

Yet regardless of which other constraints are used, a thickness constraint can also be used during the generative design process 185. Further, as noted above, gradient-based and/or non-gradient-based methods of minimizing the objective function, in a boundary-based generative design process (e.g., a level-set method) of topology optimization and/or in a density-based generative design process (e.g., a SIMP method), can be used. For example, a gradient of strain energy or a gradient of volume change can be used as a pseudo-gradient to connect the minimum thickness constraint to the shape and topology optimization process. Alternatively, a gradient of the minimum thickness constraint can be computed and used in the shape and topology optimization process.

In general a thickness constraint limits the thickness of the members/sections in the model. The sections in the model are not allowed to go below the specified thickness. But measuring the thicknesses of each individual member/section of the 3D model (local thickness measurement) during the iterative modification process can consume an inordinate amount of processing resources, and the local measure of thickness may fail in some cases, depending on how the 3D model evolves, which can prevent the generative design process from converging to a solution. Thus, as described in this specification, a generalized or global measure of thickness can be used to quantify the thickness of a model or its members/sections, enabling the generative design process 185 to efficiently and robustly determine (quantitatively) if the 3D model is thin when compared to a reference model.

When the generative design process 185 finishes, the results of generative design processing can be presented to the user, e.g., in UI 122 on display device 120, along with an option 190 to accept or reject the design. Thus, the generative design process can allow the user to choose from a set of design/shape options that are generated so that specific requirements of the user are met. If the design is rejected, the process of FIG. 1B can return to obtain 180, e.g., by CAD program(s) 116, new design variable(s) for use in producing a new generative 3D model. For example, a new design variable can include selecting 180 a different void addition and/or removal technique for changing the topology of the three dimensional shape during shape optimization and/or selecting 180 a different minimum thickness amount.

Once a design is not rejected 190, the process of FIG. 1B can provide 195, e.g., by CAD program(s) 116, the 3D model for use in manufacturing a physical structure corresponding to the object using one or more computer-controlled manufacturing systems, e.g., AM machine 170 (e.g., 3D printing), SM machine 174 (e.g., CNC milling), and/or other manufacturing machines or processes (e.g., die casting). The providing 195 can involve sending or saving the 3D model to a permanent storage device for use in manufacturing the physical structure corresponding to the object using the one or more computer-controlled manufacturing systems. In some implementations, the providing 195 involves generating 195A, e.g., by CAD program(s) 116, toolpath specification(s) for the computer-controlled manufacturing system(s) using the 3D model, and manufacturing 195B, e.g., by CAD program(s) 116, at least a portion of the physical structure corresponding to the object with the computer-controlled manufacturing system(s) using the toolpath specification(s) generated for the additive manufacturing machine. Note that the 3D model that is provided 195 can be the 3D model produced 185 by a generative design synthesis method or a post-processed version of the generative design output. For example, in some implementations, a 3D mesh model produced by a generative design synthesis method can be converted into a watertight B-Rep 3D model before being provided 195.

In some implementations, the generalized or global measure of thickness that is used to quantify the thickness of the model and its members/sections is a unitless ratio of the volume of the 3D shape squared and the surface area of the 3D shape cubed. This can be volume squared divided by surface area cubed, or surface area cubed divided by volume squared. As volume is a cube of length, and area is a square of length, taking a ratio of volume squared and area cubed produces a unitless or dimensionless quantity. Note that volume and surface area combined in this manner gives a fairly good characterization of the thickness of the 3D model overall. But other variations are also possible, provided that the measure of overall thickness is dimensionless, in that the measure doesn't depend on the dimensions of the 3D model; the thickness measure is dimension agnostic, e.g., no dimensions of length or mass, etc.

In addition, the unitless ratio can be normalized with respect to a sphere. There is a geometric property that says, for a given surface area, the geometry that gives the maximum volume is a sphere. Thus, to set the upper bound of the ratio to one, normalization of the measure with respect to a sphere can be done. For example, the ratio of volume squared divided by area cubed can be multiplied by a constant of 36π. In some implementations, the overall relationship used to measure the thickness of the 3D model is a sixth root of the normalized unitless ratio. For example, in some implementations, the following formula is used to capture the shape characteristics of a geometric model:

$$\rho = \left(36 * \pi \left(\frac{V^2}{A^3}\right)\right)^{\frac{1}{6}} \qquad (4)$$

In Equation (4), p is a generalized shape ratio, V is the volume of the geometry, and A is the surface area of the geometry. This generalized shape ratio is a non-dimensional quantity that uses volume and surface area of a given geometry to measure thickness globally. It can be noted that p=1.0 for a sphere and for any other geometry, p<1.0. This is based on the property that for a given volume, a sphere has the smallest surface area, and since the surface area is in the denominator, the maximum value for p is achieved for a sphere and for any other geometry, this value will be less than 1.0. This is an important property that can facilitate quantifying the thickness of a 3D model.

Nonetheless, it should be noted that while the ⅙ power has the advantage of transitioning the value back to one dimensional space (back to a length scale) and also spreading out the ratio values within the range of zero to one, this ⅙ power is optional. Variations include no power term, dividing area cubed by volume squared, and also potentially normalizing with respect to something other than a sphere, such as a cylinder or a cube. However, in practice, normalizing with respect to a sphere is useful because the maximum value of the ratio will not then be greater than one, and the upper bound of the ratio will not change with the geometry of the 3D model being measured for its thickness.

FIG. 2A shows an example of a process of setting a thickness constraint target for generative design. An initial 3D model is obtained 200, e.g., by CAD program(s) 116, as the design space for an object to be generatively designed (e.g., using a level-set representation of the 3D shape). For example, a user can specify a starting model, e.g., through UI 122, or the initial 3D model can be obtained by producing a convex hull of one or more input preserve bodies. In general, regardless of how it is obtained, an initial 3D model is needed in order to set the target value for the minimum thickness constraint because the desired lower limit for the unitless ratio representing the overall relationship of volume with respect to surface area will be a dimensionless quantity that is specific to the 3D model being optimized.

Figure 2B:
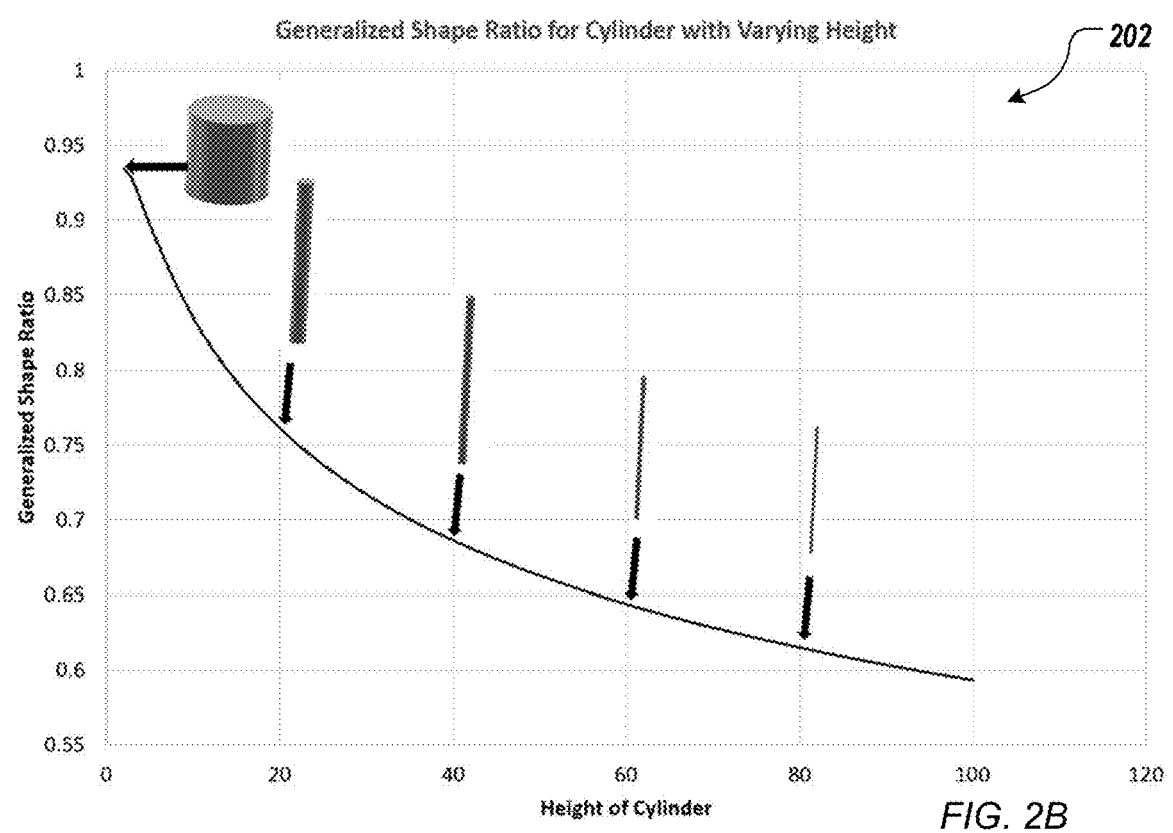
FIGS. 2B-2E show examples of plots of a generalized shape ratio for different 3D shapes and thickness variations.

Thus, it should be noted that, as a 3D model becomes thinner according to the globalized thickness measure, i.e., the surface area increases faster than the volume, then the globalized thickness measure will decrease, but the rate of decrease and the range of possible values will depend on the overall shape of the 3D model. To illustrate this further, FIG. 2B shows an example of a plot 202 of the generalized shape ratio of Equation (4) for a cylinder that is modified by

Figure 2C:
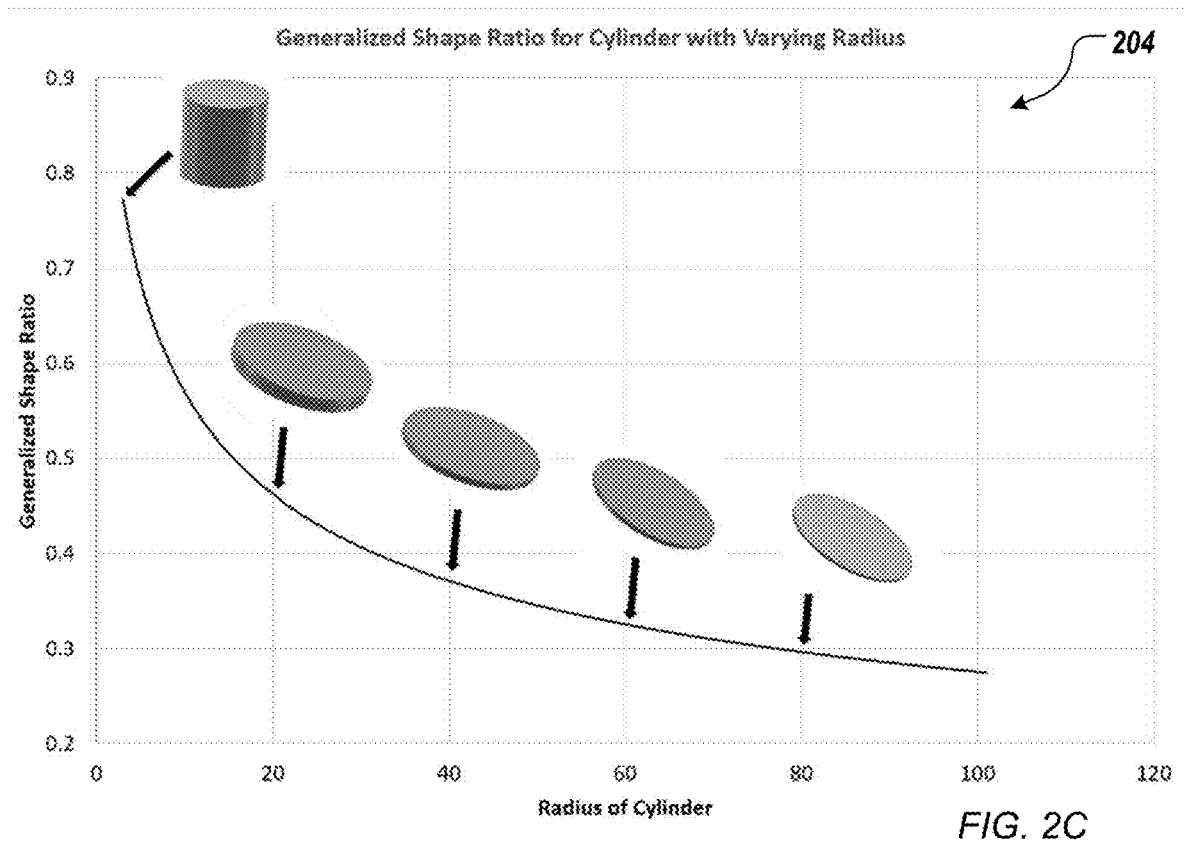

14 increasing the height of the cylinder while keeping the radius of the cylinder constant. As the cylinder height increases, the cylinder tends to become a thin rod/beam (note that the different versions of the cylinder have been scaled to fit within the area of the plot). It can be observed in plot 202 that, as the cylinder becomes thin, the generalized shape ratio decreases. FIG. 2C shows an example of a plot 204 of the generalized shape ratio of Equation (4) for a cylinder that is modified by increasing the radius of the cylinder while keeping the height of the cylinder constant (once again, the different versions of the cylinder have been scaled to fit within the area of the plot). As the radius of the cylinder increases, the cylinder tends to become a thin plate, and thus the generalized shape ratio decreases as the cylinder gets thinner overall.

Figure 2D:
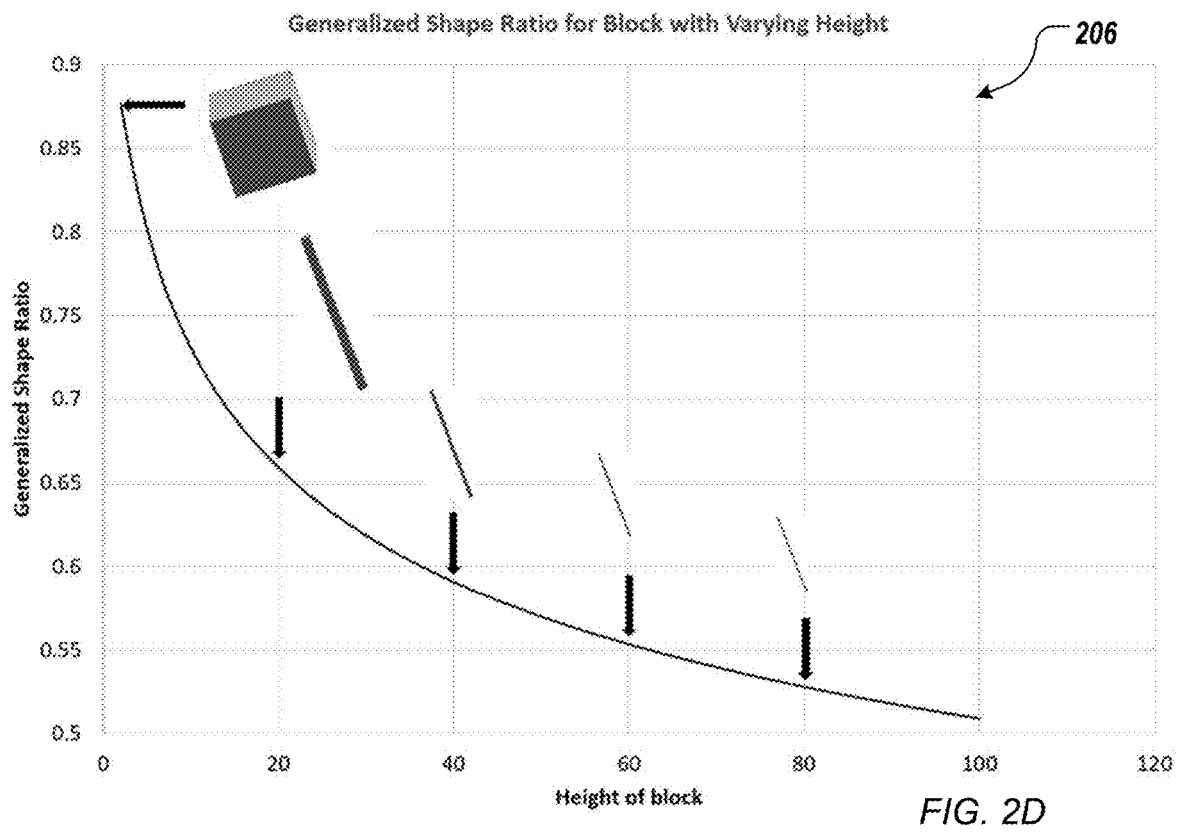
Figure 2E:
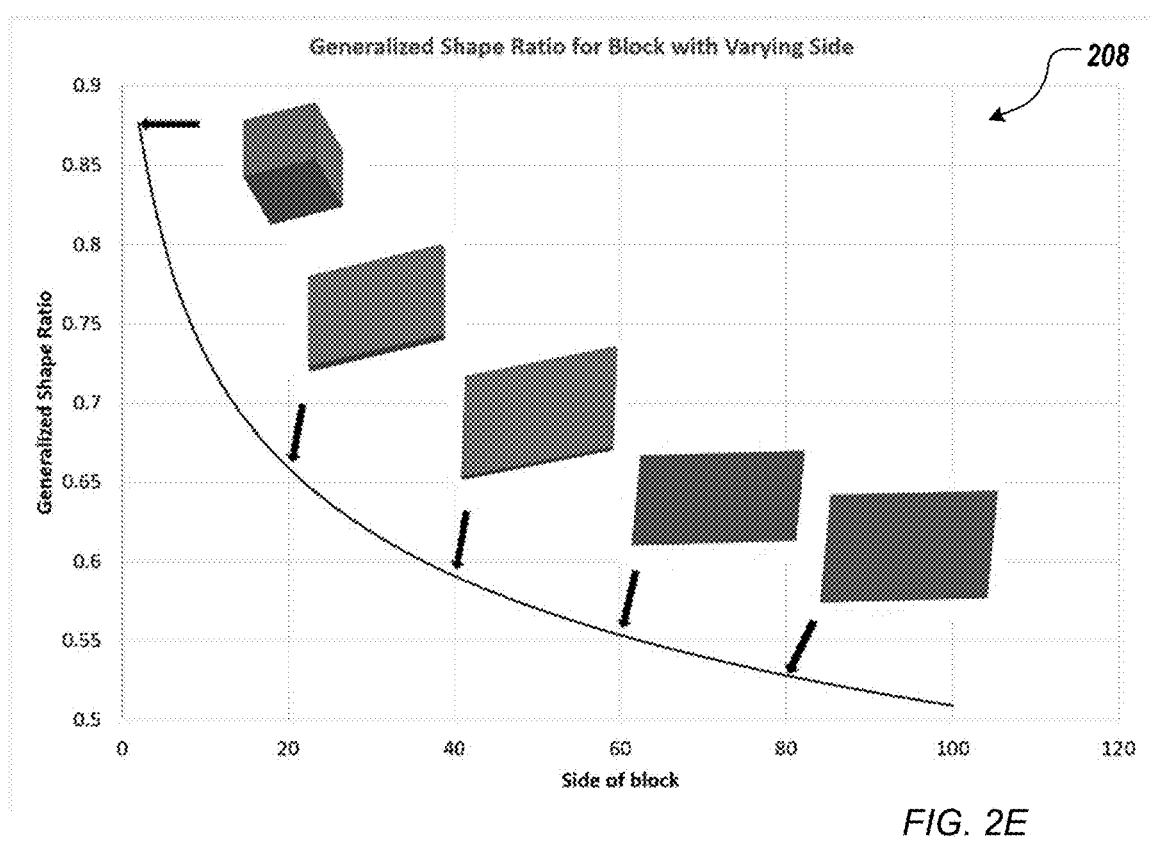

FIG. 2D shows an example of a plot 206 of the generalized shape ratio of Equation (4) for a block that is modified by increasing the height of the block while keeping the length of the block's square base constant (note that the different versions of the block have been scaled to fit within the area of the plot). As the height increases, the block tends to become a thin rod/beam, and thus the generalized shape ratio decreases as the block becomes thinner overall. FIG. 2E shows an example of a plot 208 of the generalized shape ratio of Equation (4) for a block that is modified by increasing the length of the block's square base while keeping the height of the block constant (once again, the different versions of the block have been scaled to fit within the area of the plot). As the side increases, the block tends to become a thin plate, and thus the generalized shape ratio decreases as the block becomes thinner overall. The examples of plots 202, 204, 206, 208 demonstrate the behavior of the generalized shape ratio in that, when a 3D model is thick, the generalized shape ratio is larger than when the 3D model is thin.

Since the generalized shape ratio is a non-dimensional quantity, it allows comparison of the "thickness" of two different models belonging to the same family (e.g., cylinder or block). But note that something that is thin for a cube may not be thin for a cylinder. Also, the values and rate of change in this non-dimensional ratio quantity can vary with the nature of the shape changes being made to the same family of objects. For example, comparing FIGS. 2B & 2C, for a cylinder with a height of 80 (fixed radius) the ratio value is about 0.62, but for a cylinder with radius of 80 (fixed height) the ratio value is about 0.3. Finally, notice that for a sphere, the generalized shape ratio is always 1.0, and so two different spheres of different dimensions have same "thickness" according to this measure.

Furthermore, this idea can be extended to compare "thickness" of models/objects from different families. For example, it may be used to automate the minimum thickness calculation. In some cases, it may be difficult for users to know the thickness value to be provided as input. To automate thickness value determination, a sample model (e.g., a plate or a cylinder or a model that the designer/engineer has working knowledge) can be used, and the generalized thickness ratio of such a model can be computed from its volume and surface and then be provided as an input to the main algorithm. In this case, models will be produced via generative design with similar thickness as the reference model (sample model), but the produced model may be of a different family. Other approaches to automate the thickness value can be based on voxel dimension and geometric dimensions of the design space, which need not require input from the user.

As FIGS. 2B-2E show, the lower limit for the unitless ratio (representing the overall relationship of volume with respect to surface area) will depend on the starting 3D shape. Thus, the target minimum value to be used for the minimum thickness constraint (1) should be model dependent and should take initial model characteristics into account, and (2) can incorporate a user specified thickness measure, e.g., in terms of a length scale. Note that the model characteristics at issue are not the model after topology optimization, but rather the starting model that defines the domain in which the topology optimization will be run. Also note that the user input can help to tailor the globalized thickness measure to the specific 3D model being generatively designed.

Returning to FIG. 2A, a minimum thickness value is obtained 210 for the thickness constraint for the 3D model of the object to be generatively designed. For example, a value in standard units (e.g., millimeters) can be received 210, e.g., through UI 122, or a value can be calculated 210 from a received percentage, from a user or from an automated process. For example, the user can specify the minimum thickness as a percentage of the input model, meaning the user need not know the actual dimensions of the initial 3D model used as the design space for generative design processing. In some implementations, both input options are available, and so the user (or a process) can provide an absolute measure or a relative measure of the minimum thickness for the shape and/or topology optimization process.

An initial surface area of the initial 3D model is found 220. This can be done using known techniques. For example, the surface area of a model can be computed by computing the areas of the faces of the model and summing up these areas. If the faces correspond to analytical surfaces, e.g., quadrilaterals or triangles, then analytical formulas can be used to compute the area. Otherwise, the faces can be tessellated into triangles and the area can be computed by summing the areas of all the triangles. Such functions and algorithms are readily available in CAD software or from other sources.

Further, an initial volume of material in a hollow 3D object having a shape of the initial 3D model and a thickness defined by the minimum thickness value is calculated 230. This can involve multiplying 230 the initial surface area of the initial 3D model by the minimum thickness value for the thickness constraint. Then, a target minimum value for the thickness constraint is set 240 using the unitless ratio of the initial volume and the initial surface area, e.g., a unitless ratio normalized with respect to a sphere, such as the sixth root of the normalized ratio provided above in Equation (4). A detailed example is provided below, but it will be appreciated that other approaches can be used for setting the target minimum value for enforcing the minimum thickness constraint during topology optimization, provided that the initial 3D shape (from which mass will be removed during topology optimization) is taken into account when setting the target minimum value for the thickness constraint.

Figure 2F:
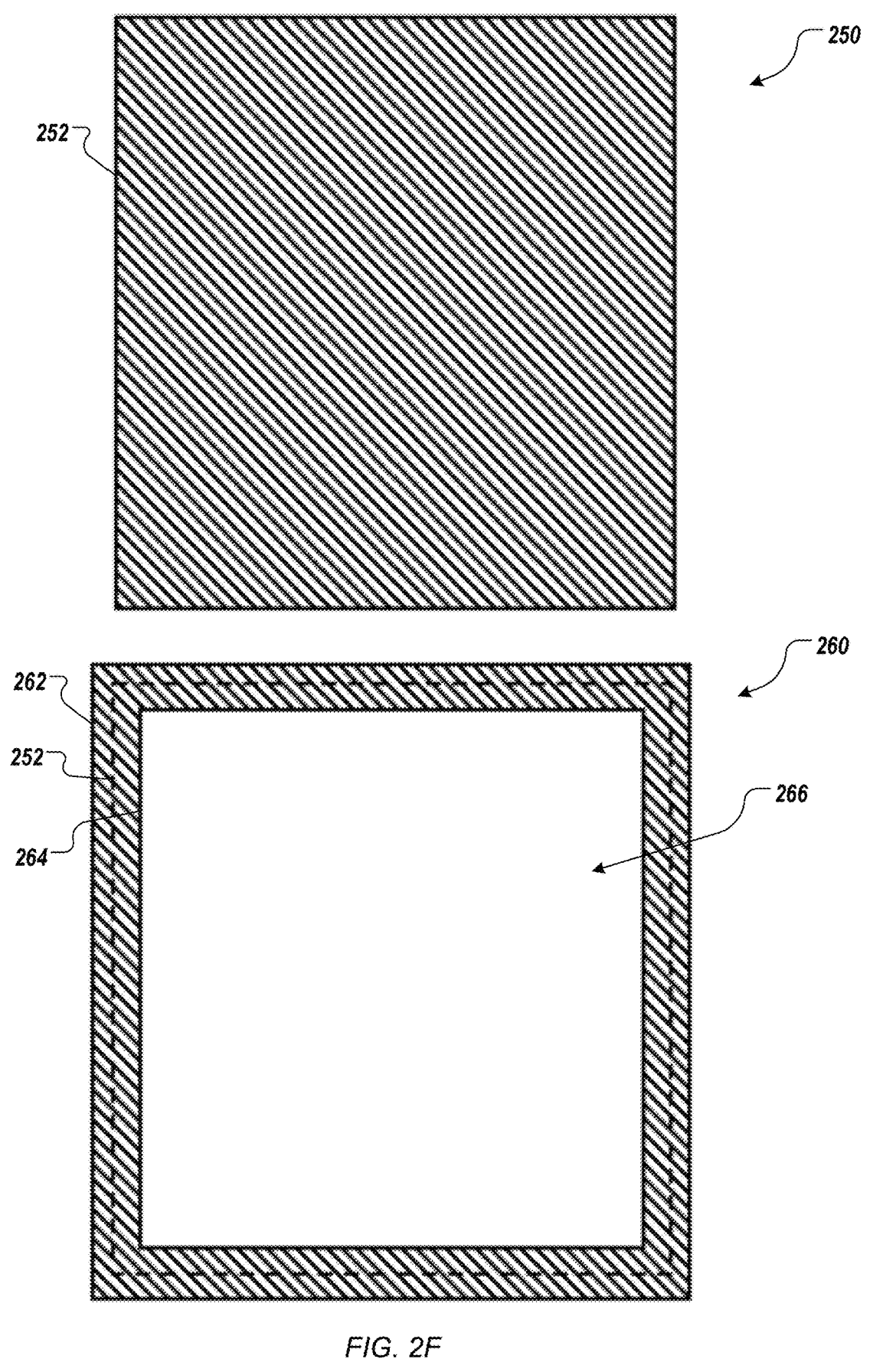

FIG. 2F shows an example of determining an initial volume of a hollow 3D object 260 having a shape of the initial 3D model 250 used for generative design. This example is presented as a 2D square to represent the initial (input) 3D model 250 for ease of understanding. The input 3D model 250 has a boundary surface 252 which contains the solid material of the input model 250. The area, $S_{limit}$, of this surface 252 of the model 250 can be computed at the beginning of shape evolution in the generative design process.

Further, the hollow 3D object 260 (a hypothetical thinnest possible version of the initial model 250) is produced from the input model 250 by extending the surface 252 by a minimum thickness value, t, provided by the user (or an input process) or derived from information (e.g., a percentage value) provided by the user (or an input process). In the example shown, the surface 252 is extended outward by t/2 to produce outer surface 262 of the 3D object 260, and the surface 252 is extended inward by t/2 to produce the inner surface 264 of the 3D object 260. Note that the 3D object is hollow in that the inner surface 264 contains no material 266; all the material of the 3D object 260 is contained between the surfaces 262, 264, which are separated from each other by the minimum thickness t.

Of course, the hollow 3D object 260 need only be a hypothetical model, as an actual 3D model of the object 260 need not be constructed. Moreover, the volume of this hypothetical 3D model 260 is $V_{limit}=s*t$, where is s can be the surface area of the surface 262, the surface area of the surface 264, or simply the surface area of the surface 252, i.e., $S_{limit}$. Thus, a shell of the original 3D model can be produced based on the minimum thickness value limit, and the unitless ratio of this shell model is used as the thickness constraint target. For example, in the case of the generalized shape ratio of Equation (4), the target minimum thickness value for the thickness constraint can be set using the following formula:

$$\rho_{limit} = \left(36 * \pi \left(\frac{V_{limit}^2}{s_{limit}^3}\right)\right)^{\frac{1}{6}} \tag{5}$$

Such a minimum thickness value sets a lower limit on the generalized shape ratio for the model, where this lower limit takes into account the initial shape and the specified minimum thickness value, and then this lower limit can be used to impose thickness control of the 3D model in a global sense, i.e., it can be used as a constraint in a topology optimization process.

The phrase, "global sense" here means that the thickness is not controlled point-wise in the model, but an overall (average) value of thickness is controlled. Mathematically, this constraint is expressed as shown in Equation (6).

$$\rho \geq \mu_{limit} \tag{6}$$

In Equation (6), p is the generalized shape ratio of the model at the current state of shape evolution, and $\beta_{limit}$ is the limit value below which the model is prohibited to evolve. As explained above, $\beta_{limit}$ can be a dimensionless quantity that is specific to the model that is being topologically optimized. Thus, two different models with different initial shape characteristics can require different values of $\beta_{limit}$. Furthermore, two different models may have different requirements on thickness control, and this is accounted for by determining a suitable $\beta_{limit}$ value based on the user (or process) input indicating the desired minimum thickness of a member/section for the model at hand. Thus, in some implementations, the user can adjust the input minimum thickness value to cause the $\beta_{limit}$ value to change accordingly, which will result in a different output 3D model from the generative design process, and so the user can assist in making the model dependent limit value for the unitless ratio take the model characteristics into account by adjusting the minimum thickness input value in view of prior generative design 3D model result(s).

Figure 3A:
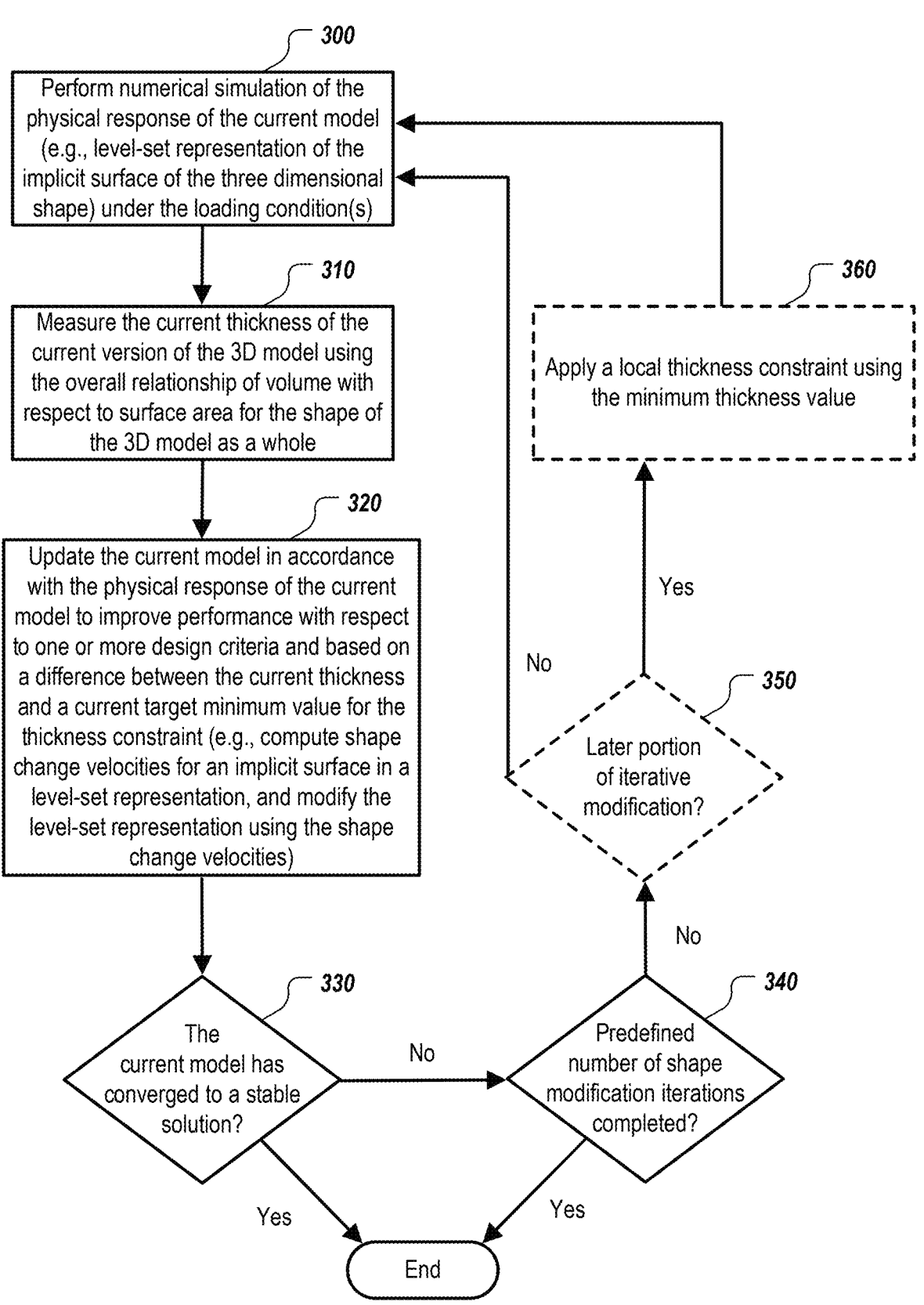
FIG. 3A shows an example of a generative design process using a global thickness constraint.

FIG. 3A shows an example of a generative design process using a global thickness constraint. The process of FIG. 3A is an example of a topology optimization loop in which the 3D shape of the modeled object is iteratively modified during a generative design process 185. The topology optimization loop includes performing 300 numerical simulation of the modeled object in accordance with a current version of the 3D shape and the one or more in-use load cases to produce a current numerical assessment of a physical response (e.g., structural response) of the modeled object. As noted above, various types of numerical simulation can be performed 300.

In some implementations, the generative design software can provide a general platform for generative design by leveraging different physics-based solvers for shape and topology optimization. Further, in some implementations, the topology optimization is based on a level-set approach. Thus, the current version of the 3D shape can be a level-set representation of an implicit surface of the 3D shape.

Figure 3B:
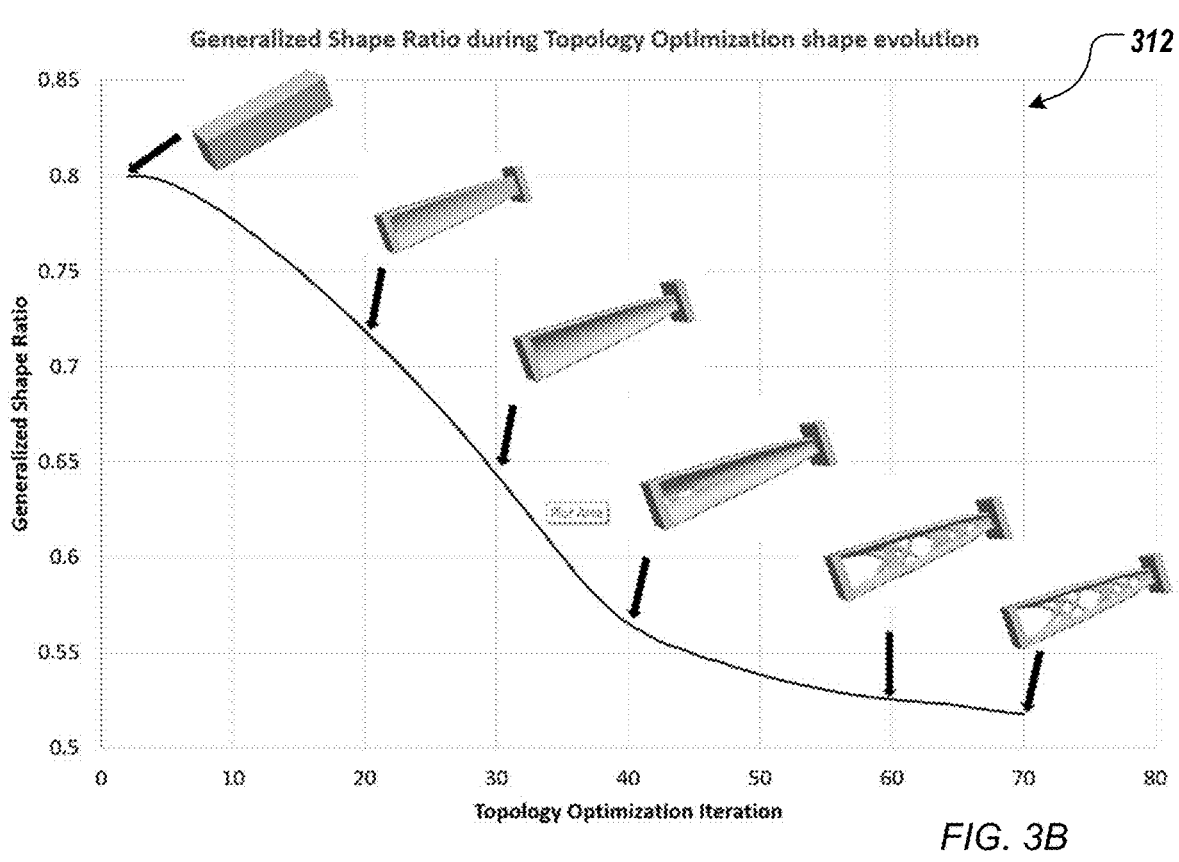
FIG. 3B shows an example of a plot of a generalized shape ratio for a 3D model during topology optimization.

The current thickness of the current version of the 3D shape is measured 310 using the overall relationship of volume with respect to surface area for the 3D shape as a whole. For example, the generalized shape ratio of Equation (4) can be used for thickness control during generative design of a modeled object. FIG. 3B shows an example of a plot 312 of the generalized shape ratio of Equation (4) for a 3D model during topology optimization. As shown in FIG. 3B, the 3D model gets thinner as the optimization progresses, and the generalized shape ratio decreases as the model gets thinner. As the 3D model undergoes shape evolution during topology optimization, material gets removed from the 3D model, causing the 3D model to get "thinner", and this is reflected in the values of the generalized shape ratio.

To provide the thickness control using the global measure of thickness, a lower limit for the global measure of thickness, e.g., for the generalized shape ratio of Equation (4), is set (such as described above) so that the optimization loop will push the shape evolution toward this lower limit without violating it. Using this restriction during topology optimization will ensure that material is not removed in such a way that the overall "thickness" of the 3D model is maintained above this limit.

Returning to FIG. 3A, the current version of the three dimensional shape (the current 3D model) is updated 320 based on the current numerical assessment of the physical response, and based on a difference between the current thickness and a current target minimum value for the thickness constraint, to produce an updated version of the three dimensional shape of the modeled object. The updating 320 based on the current numerical assessment of the physical response causes the shape to evolve in accordance with the physical response of the current model to improve performance of the model with respect to the one or more design criteria. Further, the updating 320 based on the difference between the current global thickness measure and a current target minimum value for the global thickness measure causes the shape to evolve toward using thinner structures while keeping the overall thickness measure above the set minimum.

In addition, note that the updating 320 of the shape during topology optimization can be done using a density-based approach or a boundary-based approach. In some implementations, a SIMP method is used to represent the modeled object during topology optimization. In this approach, the design region is divided (partitioned) into smaller pieces termed as "elements". Elements form building blocks for representation of a shape. Examples are classified based on the geometry they can represent. Some examples of elements are tetrahedron, hexahedron, pentahedron, pyramid and so on.

A collection of elements is termed as a grid or a mesh. This mesh is very similar to the meshes used in Finite Element Analysis (FEA). The design variables in the topology optimization correspond to the density of material in each element. Density represents how much of the element is occupied by material. It can be mathematically defined as $$d = \frac{\text{Volume occupied by material}}{\text{Total Volume of element}}.$$

For example, if the density is 1.0, then the entire element is occupied by the material, if the density is 0.5, then half of the element is occupied by the material and if the density is 0.0, then there is no material in the element.

As the topology optimization algorithm progresses, some elements will get densities closer to 1.0 and other elements get densities closer to 0.0 during the updating 320. The collection of all elements with densities closer to 1.0 form the outcome shape (the optimized shape). In practice, an iso-surface of all elements with density greater than a given threshold (like 0.5) is used to create the outcome geometry.

In order to impose the global thickness constraint, the volume and surface computations can be done as follows. Volume can be computed by calculating the material volume in each element (density*element volume) and then summing the material volume over all elements. Surface area can be computed by calculating the iso-surface and then calculating the surface area of the iso-surface. For example, the iso-surface can be tessellated into triangles, and the surface area can be calculated by computing the area of each surface triangle and summing it over all the surface triangles.

In general, an optimization algorithm computes the optimal solution by iterating over several steps. In each iteration, the following quantities are computed: (1) values of the objectives and constraints, and (2) gradients of the objectives and constraints. Also, as noted above, gradient-based and/or non-gradient-based methods of minimizing the objective function can be used, e.g., a pseudo or proxy gradient can be used for the global thickness constraint, in which case, the global thickness constraint may not be a formal thickness constraint, but rather be a design criterion that limits a minimum thickness of the generatively designed three dimensional shape. In any case, the computed quantities determine the search direction along which the algorithm will move in order to reach the optimal solution.

For the global minimum thickness constraint, some form of gradient information is needed for use in the topology optimization process. The global minimum thickness constraint is a function of the volume and surface area, and so the gradient of volume with respect to the element density and the gradient of surface area with respect to element density can be computed in a density-based approach to topology optimization. The volume of each element is directly related to the element density, however the surface area is not directly related to the element density and therefore indirect approaches can be used for computing gradients of surface area. However, in some implementations, the same gradient direction as an objective (e.g., strain energy) can be used as a proxy (or surrogate) for the thickness constraint gradient. In this case, the gradient direction of the objective is used as the gradient direction of the thickness control constraint/criterion.

In some implementations, a level-set method is used to represent the modeled object during topology optimization. Thus, the updating 320 can include computing shape change velocities for an implicit surface in a level-set representation of the 3D shape in accordance with the current numerical assessment and the difference between the current thickness and the current target minimum value for the thickness constraint, and modifying the level-set representation using the shape change velocities to produce an updated version of the three dimensional shape of the modeled object. In a level-set based approach, one or more level sets are used to represent the geometry. The geometry boundaries are defined by the level-set representation. The optimization process proceeds by moving the boundary of the geometry along the local normal direction. The amount of change in the boundary is determined by: (1) values of the objectives and constraints, and (2) gradients of the objectives and constraints.

As with the SIMP approach described above, in order to apply the global minimum thickness constraint during topology optimization, values and gradients of the objective(s) and constraints can be computed at each iteration. Volume is computed by calculating the volume occupied by the level-set representation, and the surface area is computed by calculating the surface area of the level-set representation. The gradients used in the level-set approach are termed a "shape derivative" as they represent how a quantity changes responsive to a small change to the shape. In order to compute the shape derivative for the global minimum thickness constraint, the shape derivative of volume and shape derivative of surface area can be computed. However, as before, gradient-based and/or non-gradient-based methods of minimizing the objective function can be used, e.g., a pseudo or proxy gradient (shape derivative) can be used for the global thickness constraint. Thus, in some implementations, the same gradient direction as an objective (e.g., strain energy) can be used as a proxy (or surrogate) for the thickness constraint gradient. In this case, the gradient direction of the objective is used as the gradient direction of the thickness control constraint criterion, and so the global thickness constraint may not be a formal thickness constraint, but rather be a design criterion that limits a minimum thickness of the generatively designed three dimensional shape. For further details regarding proxy (or surrogate) gradients, see U.S. App. No. 63/044,666, titled "GENERATIVE DESIGN SHAPE OPTIMIZATION WITH CONTROLLED CONVERGENCE FOR COMPUTER AIDED DESIGN AND MANUFACTURING," filed on Jun. 26, 2020.

In any case, regardless of whether a density-based method or a boundary-based method is used during the topology optimization process, a check 330 can be made for convergence during each iteration. The generative design has converged to a stable solution once all the design constraints are met and no design objectives have improved significantly (e.g., no more than a 5%, 4%, 3%, 2%, or 1% improvement) since the prior one or more iterations. Thus, in some implementations, at least the performing 300 of numerical simulation, the measuring 310 of the global thickness, and the updating 320 of the 3D model are repeated until the generatively designed 3D shape of the modeled object in the design space converges to a stable solution for the one or more design criteria and the one or more in-use load cases, i.e., the process iterates until convergence. Further, in some implementations, the iterative process ends once a check 340 shows that a predetermined number of shape modification iterations have been performed. Note that the predetermined number of shape modification iterations can be set high enough that it is essentially guaranteed that all design constraints will be met.

Figure 3C:
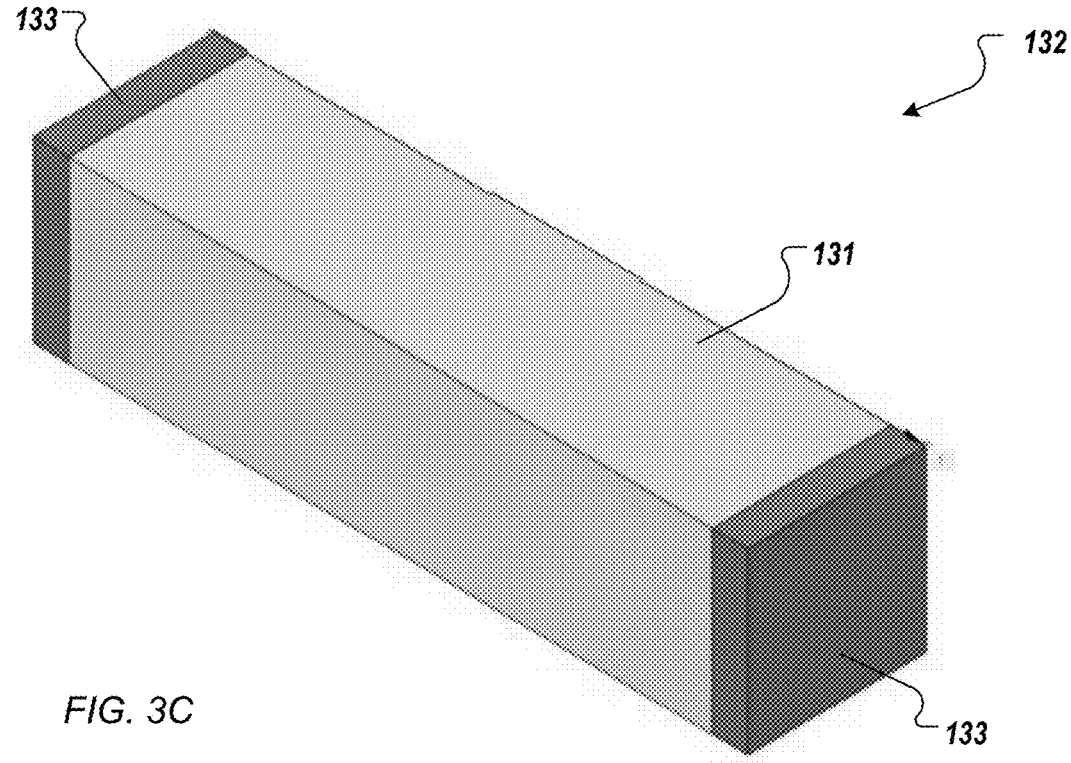
FIG. 3C shows an example of input to a topology optimization process.

FIG. 3C shows an example of input to a topology optimization process. The example of FIG. 3C is the same starting model 132 shown in FIG. 1A, which corresponds to the shape evolution shown in FIG. 3B. The starting model 132 includes preserve geometry solids 133 and the design space 131 formed there between. In this example, the starting model 132 represents a beam placed under a bending load, where the beam is fixed on one end (the left end) and loaded on the other end (the right end).

The solids 133 are preserved during the topology optimization, i.e., no material is removed from them, and the design space 131 is the initial shape for the shape evolution, in which material is added or removed from this region 131 as the shape evolves. In this example, the objective is minimization of compliance, and the constraint is that volume fraction of the design region 131 (which excludes preserve regions 133) should reach 5% of the original design region. Compliance is a measure of how flexible the model is and when the compliance is minimized, the model will have the lowest flexibility possible for the given volume.

Figure 3D:
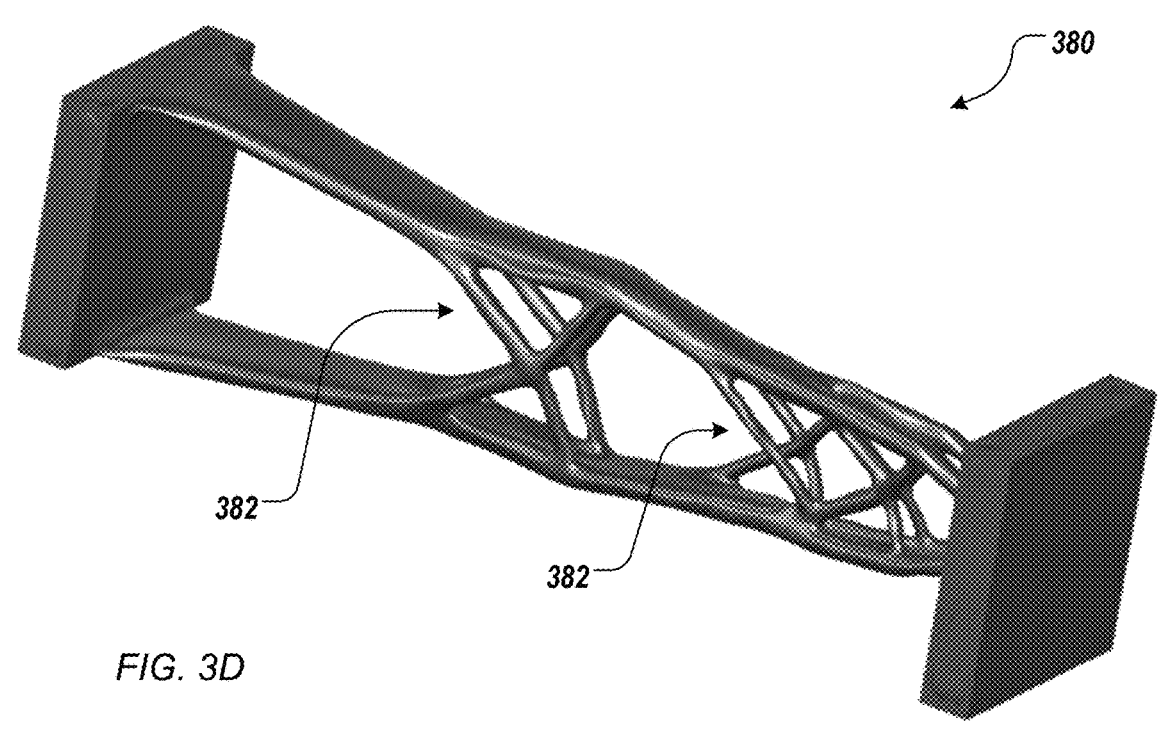
FIGS. 3D & 3E show examples of output from the topology optimization process performed using the example of input from FIG. 3C.
Figure 3E:
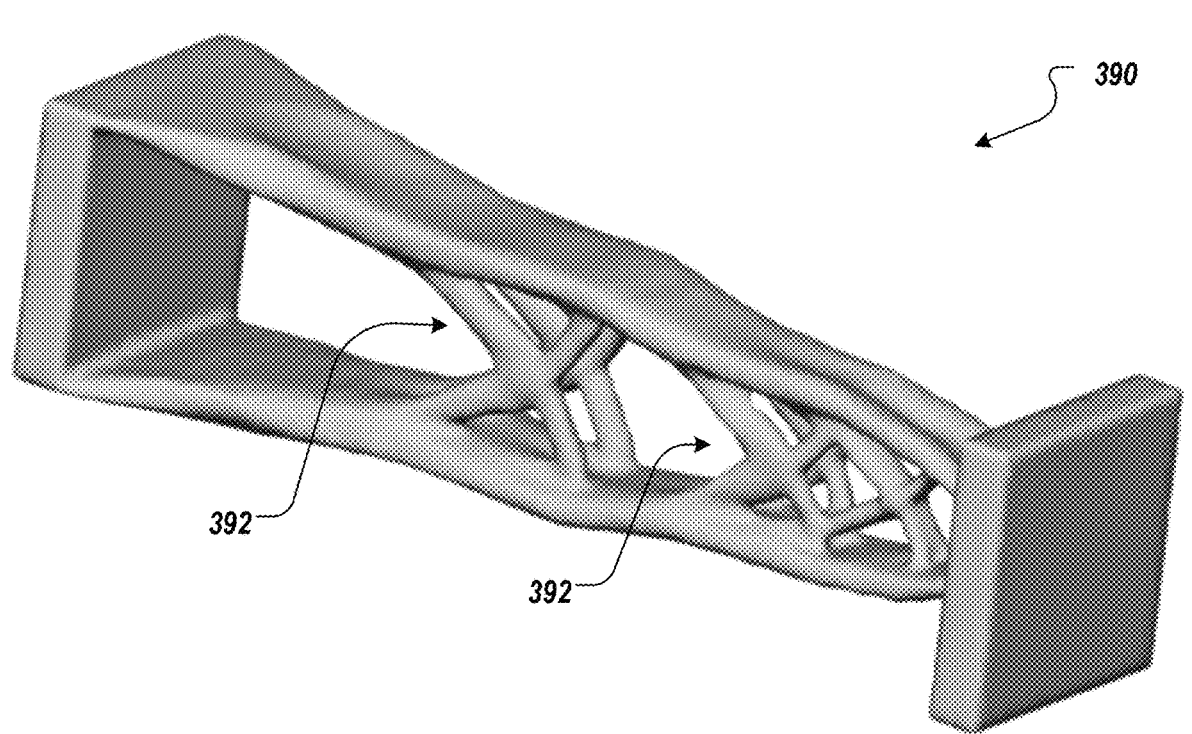

FIG. 3D shows an example of an output 3D model 380 from the topology optimization process performed using the example of input from FIG. 3C. The 3D model 380 is the result of topology optimization without using a minimum thickness constraint, as described in this specification. As shown, the 3D model 380 includes thin regions 382. In contrast, FIG. 3E shows another example of an output 3D model 390 from the topology optimization process performed using the example of input from FIG. 3C. In this example, the 3D model 390 is the result of topology optimization that uses the minimum thickness constraint, as described in this specification. As shown, the 3D model 390 (the final solution from shape evolution) has regions 392 that are thicker in comparison with the regions 382. Note that this thickening of the struts within the 3D model is a result of the global thickness constraint, which is only imposed on the model as a whole, not a thickness constraint that is enforced locally within different portions of the 3D model as the 3D shape of the model evolves.

The example of FIG. 3E is the 3D shape that is produced when the global thickness limit was set to 0.982 mm for a beam of approximately 100 mm in length. Using the same input 3D model 132 with a global thickness limit set to 1.47 mm, the 3D shape that is produced has even thicker struts therein, as shown by the complete structure 138 in FIG. 1A. As this shows, changing the global thickness limit results in local thickness changes in the final solution produced by the topology optimization during shape evolution, even though the thickness measure is global in nature, i.e., there is one measure of thickness for the entire 3D model. This enables efficient shape and/or topology optimization that also prevents the production of overly thin regions in the optimized shape. Such thin regions can result in structural performance degradation (e.g., thin members in the 3D model can increase the chance of buckling or other part failure) or manufacturing difficulties (e.g., thin members can cause difficulties in 3D printing as such thin members are inherently not very stiff and may not take the self-load while 3D printing). Thus, the global thickness control systems and techniques described in this specification are readily usable with complex 3D models being produced using generative design processes and can ensure structural integrity and manufacturability of the generative design outcomes.

The described overall thickness control allows the production of 3D shapes that are structurally strong for different manufacturing processes, without adding significantly to computational costs, which can reduce monetary costs as well, such as when cloud services are used for the generative design process. However, because a global measure of thickness is used rather than a local measure of thickness, the generative design process cannot ensure that none of the struts 392 will have a thickness that is under the minimum thickness desired by the user. In practice, this will not typically matter, as the generative design process will tend to move toward solutions that do not have thinner struts 392, and thinner struts 392 will also be disfavored by the structural analysis during numerical simulation, and so the topology optimization tends to move to a solution that satisfies the global thickness constraint without having to use a local thickness constraint. And in any case, if a strut ends up being too thin, the user can run the generative design process again with a larger minimum thickness value. Nonetheless, in some implementations, a thickness constraint that uses a local thickness measure can also be used to ensure that no members/regions/struts in the final design are thinner than the required minimum thickness.

Returning to FIG. 3A, in some implementations, the shape optimization loop includes two or more portions, in which one or more different constraints and/or constraint targets are used in the different portions of the optimization loop. Thus, a check 350 can be performed to determine whether a later portion (e.g., a second of two portions) of the iterative modification of the shape has begun. If so, a local thickness constraint can be applied 360 using the minimum thickness value used previously for the global thickness measure. Note that the thickness constraint that uses the global thickness measure can also continue to be used in this second portion of the iterative modification, or not, but the thickness constraint that uses the local thickness measure should not be used in the first portion of the iterative modification, as this will add computational complexity that may cause the generative design process to fail for complex models.

Thus, the global thickness constraint can be used in a first portion of the topology optimization to evolve the shape rapidly during this first portion, and a local thickness constraint can be used in a second portion of the topology optimization, e.g., once the generative design process is close to (e.g., within 5%, 4%, 3%, 2%, or 1% of) a final solution for the 3D model. Techniques for local thickness control in topology optimization include the medial-axis and rolling ball approaches, or other approaches that measure thickness locally at sub-regions within the 3D model. Moreover, in some cases, the first portion of the topology optimization evolves the 3D shape of the model to a final proposed solution, and the second portion of the topology optimization is a final one or more iterations that confirm the minimum thickness has been achieved in all regions of the generatively designed 3D model.

Thus, the computationally efficient and robust global minimum thickness constraint can be augmented with a local minimum thickness constraint once the generative design process using the global minimum thickness constraint has done most of the work toward producing a final design. The local minimum thickness constraint can then ensure that the thickness of the 3D model is not less than the specified minimum thickness at any location within the 3D model, but as this local thickness check is only performed towards the end, most of computational and robustness advantages of the global thickness constraint are still achieved. The generative design process still remains substantially faster than would be the case if a local thickness constraint were applied throughout the process, as the local thickness measure need not be computed throughout the 3D model during each iteration of the optimization loop.

Finally, while only two separate portions of the iteration loop are represented in FIG. 3A, it will be appreciated that more than two portions of the iteration loop can be implemented, where different constraints and/or constraint targets are used in the different portions of the optimization loop. This can be the case with or without the use of a local minimum thickness constraint. For example, the current target value for the globally measured minimum thickness constraint can be selected from a series of target values that range from a value less than the initial thickness measure for the starting model to a final value, e.g., computed using Equation (5), and the iteration loop can selectively use increasingly smaller target values from the series in respective portions of the iteration loop, until the final, globally measured target minimum thickness target value, e.g., computed using Equation (5), is used at the end of topology optimization. Thus, generative design shape optimization with controlled convergence can be employed, as described in U.S. App. No. 63/044,666, which is titled "GENERATIVE DESIGN SHAPE OPTIMIZATION WITH CONTROLLED CONVERGENCE FOR COMPUTER AIDED DESIGN AND MANUFACTURING," filed on Jun. 26, 2020.

Figure 4:
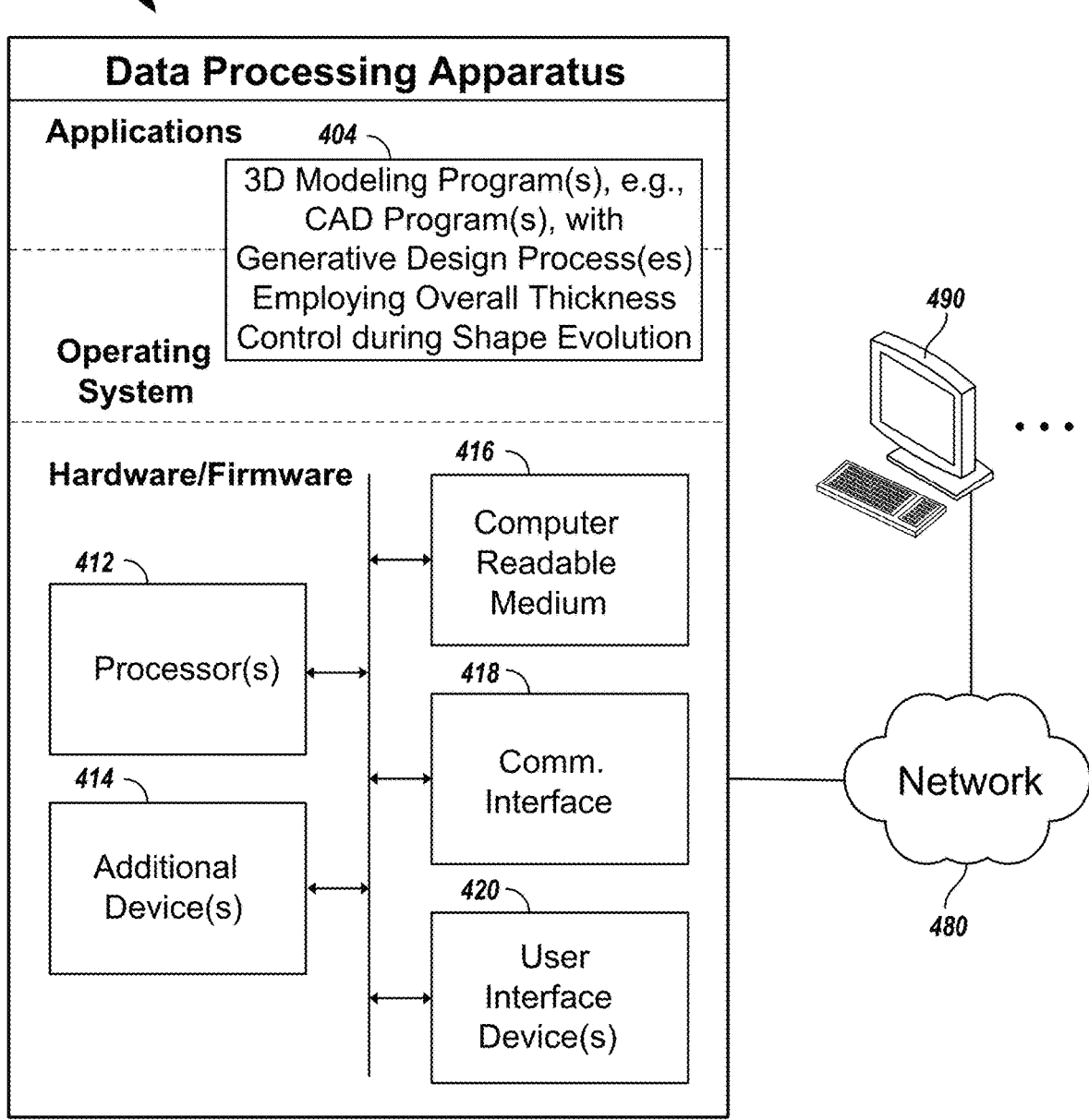
FIG. 4 is a schematic diagram of a data processing system usable to implement the described systems and techniques.

FIG. 4 is a schematic diagram of a data processing system including a data processing apparatus 400, which can be programmed as a client or as a server. The data processing apparatus 400 is connected with one or more computers 490 through a network 480. While only one computer is shown in FIG. 4 as the data processing apparatus 400, multiple computers can be used. The data processing apparatus 400 includes various software modules, which can be distributed between an applications layer and an operating system. These can include executable and/or interpretable software programs or libraries, including tools and services of one or more 3D modeling programs 404 that implement the systems and techniques described above. Thus, the 3D modeling program(s) 404 can be CAD program(s) 404 (such as CAD program(s) 116) and can implement one or more generative design processes (e.g., using level-set based method(s) for generative design) for shape and/or topology optimization and physical simulation operations (finite element analysis (FEA) or other) that employ overall thickness control during shape evolution. Further, the program(s) 404 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 400 also includes hardware or firmware devices including one or more processors 412, one or more additional devices 414, a computer readable medium 416, a communication interface 418, and one or more user interface devices 420. Each processor 412 is capable of processing instructions for execution within the data processing apparatus 400. In some implementations, the processor 412 is a single or multi-threaded processor. Each processor 412 is capable of processing instructions stored on the computer readable medium 416 or on a storage device such as one of the additional devices 414. The data processing apparatus 400 uses its communication interface 418 to communicate with one or more computers 490, for example, over a network 480. Examples of user interface devices 420 include a display, a camera, a speaker, a microphone, a tactile feedback device, a keyboard, a mouse, and VR and/or AR equipment. The data processing apparatus 400 can store instructions that implement operations associated with the program(s) described above, for example, on the computer readable medium 416 or one or more additional devices 414, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
obtaining one or more boundary conditions and one or more design criteria, including a minimum thickness value, for a modeled object to be produced;
iteratively modifying a geometry of a three-dimensional shape of the modeled object in accordance with the one or more design criteria and the one or more boundary conditions to produce a three-dimensional computer-aided design model of the modeled object, wherein the geometry of the three dimensional shape is represented in computer memory by a discretized volume having density values or distance-to-boundary values assigned to discrete cells of the discretized volume, and the iteratively modifying comprises, in each of multiple iterations of the iteratively modifying, performing operations comprising
measuring a current thickness of the modeled object by calculating a non-dimensional quantity that uses a current volume and a current surface area of the three-dimensional shape defined by the density values or the distance-to-boundary values assigned to the discrete cells of the discretized volume in the computer memory, wherein the calculating does not include evaluating thickness at multiple points within the three-dimensional shape, thereby reducing computation time for the measuring and avoiding any computational failure at an individual point within the three-dimensional shape, and
modifying the density values or the distance-to-boundary values assigned to the discrete cells of the discretized volume in the computer memory to update the geometry of the three-dimensional shape based on a difference between the current thickness and the minimum thickness value, making one or more portions of the three-dimensional shape thinner while also keeping the current thickness of the modeled object above the minimum thickness value, thereby preventing production of thin regions in the three-dimensional computer-aided design model that would result in structural performance degradation or manufacturing difficulties for the modeled object, until the geometry of the three-dimensional shape converges to a stable solution or a predefined number of shape modification iterations have been performed; and
providing the three-dimensional computer-aided design model of the modeled object.

2. The method of claim 1, further comprising obtaining the minimum thickness value by calculating a single global measure of thickness for a sample model.

3. The method of claim 1, further comprising obtaining the minimum thickness value including receiving a user input specifying a percentage of an input model.

4. The method of claim 1, wherein the obtaining comprises obtaining the one or more boundary conditions using a set of input solids.

5. The method of claim 4, wherein the iteratively modifying comprises modifying a topology of the three-dimensional shape in addition to the geometry of the three-dimensional shape.

6. The method of claim 5, wherein the iteratively modifying uses one or more level-set based topology optimization methods, and a same gradient used in the one or more level-set based topology optimization methods for an objective of the one or more design criteria is used as a proxy for a thickness control gradient.

7. The method of claim 1, wherein the current thickness value is a dimensionless quantity normalized with respect to a sphere.

8. The method of claim 7, wherein a lower limit for the dimensionless quantity is dependent on an initial three-dimensional shape of the modeled object.

9. The method of claim 8, wherein the iteratively modifying comprises a second set of iterations following a first set of iterations, the first set of iterations comprises the multiple iterations of the iteratively modifying, and the second set of iterations comprises applying a local thickness constraint using the minimum thickness value.

10. A system comprising:
a non-transitory storage medium having instructions stored thereon; and
one or more data processing apparatus configured to run the instructions to perform operations comprising:
obtaining one or more boundary conditions and one or more design criteria, including a minimum thickness value, for a modeled object to be produced;
iteratively modifying a geometry of a three-dimensional shape of the modeled object in accordance with the one or more design criteria and the one or more boundary conditions to produce a three-dimensional computer-aided design model of the modeled object, wherein the geometry of the three dimensional shape is represented in computer memory by a discretized volume having density values or distance-to-boundary values assigned to discrete cells of the discretized volume, and the iteratively modifying comprises, in each of multiple iterations of the iteratively modifying, performing operations comprising measuring a current thickness of the modeled object by calculating a non-dimensional quantity that uses a current volume and a current surface area of the three-dimensional shape defined by the density values or the distance-to-boundary values assigned to the discrete cells of the discretized volume in the computer memory, wherein the calculating does not include evaluating thickness at multiple points within the three-dimensional shape, thereby reducing computation time for the measuring and avoiding any computational failure at an individual point within the three-dimensional shape, and modifying the density values or the distance-to-boundary values assigned to the discrete cells of the discretized volume in the computer memory to update the geometry of the three-dimensional shape based on a difference between the current thickness and the minimum thickness value, making one or more portions of the three-dimensional shape thinner while also keeping the current thickness of the modeled object above the minimum thickness value, thereby preventing production of thin regions in the three-dimensional computer-aided design model that would result in structural performance degradation or manufacturing difficulties for the modeled object, until the geometry of the three-dimensional shape converges to a stable solution or a predefined number of shape modification iterations have been performed; and providing the three-dimensional computer-aided design model of the modeled object.

11. The system of claim 10, wherein the operations further comprise obtaining the minimum thickness value by calculating a single global measure of thickness for a sample model.

12. The system of claim 10, wherein the operations further comprise obtaining the minimum thickness value including receiving a user input specifying a percentage of an input model.

13. The system of claim 10, wherein the one or more data processing apparatus are configured to run the instructions to obtain the one or more boundary conditions using a set of input solids.

14. The system of claim 13, wherein the one or more data processing apparatus are configured to run the instructions to iteratively modify a topology of the three-dimensional shape in addition to the geometry of the three-dimensional shape.

15. The system of claim 14, wherein the iterative modification uses one or more level-set based topology optimization methods, and a same gradient used in the one or more level-set based topology optimization methods for an objective of the one or more design criteria is used as a proxy for a thickness control gradient.

16. The system of claim 10, wherein the current thickness value is a dimensionless quantity normalized with respect to a sphere.

17. The system of claim 16, wherein a lower limit for the dimensionless quantity is dependent on an initial three-dimensional shape of the modeled object.

18. The system of claim 17, wherein the iterative modification comprises a second set of iterations following a first set of iterations, the first set of iterations comprises the multiple iterations, and the one or more data processing apparatus are configured to run the instructions to apply a local thickness constraint using the minimum thickness value in the second set of iterations.

* * * * *